US010846783B2

(12) United States Patent
Alde et al.

(10) Patent No.: US 10,846,783 B2
(45) Date of Patent: Nov. 24, 2020

(54) DENTAL RELATIONSHIP MANAGEMENT SYSTEM AND PROCESS

(71) Applicant: Arklign Inc., San Jose, CA (US)

(72) Inventors: Ray Alde, San Jose, CA (US); Rex Ho, Fremont, CA (US)

(73) Assignee: ARKLIGN INC., San Jose, CA (US)

( * ) Notice: Subject to any disclaimer, the term of this patent is extended or adjusted under 35 U.S.C. 154(b) by 558 days.

(21) Appl. No.: 15/474,649

(22) Filed: Mar. 30, 2017

(65) Prior Publication Data

US 2018/0285961 A1    Oct. 4, 2018

(51) Int. Cl.
*G06Q 30/00* (2012.01)
*G06Q 30/06* (2012.01)

(52) U.S. Cl.
CPC ......... *G06Q 30/0635* (2013.01); *G06Q 30/06* (2013.01); *G06Q 30/0601* (2013.01); *G06Q 30/0613* (2013.01); *G06Q 30/0633* (2013.01); *G06Q 30/0637* (2013.01); *G06Q 30/0641* (2013.01)

(58) Field of Classification Search
CPC ................ G06Q 30/0601–0645; G06Q 30/08
USPC ............................................... 705/26.1–27.2
See application file for complete search history.

(56) References Cited

U.S. PATENT DOCUMENTS

| | | | | |
|---|---|---|---|---|
| 2004/0153341 | A1* | 8/2004 | Brandt | G06F 19/3481 705/2 |
| 2013/0218580 | A1* | 8/2013 | Bertrand | G06Q 30/0633 705/2 |
| 2014/0279294 | A1* | 9/2014 | Field-Darragh | G06Q 10/087 705/28 |
| 2015/0332018 | A1* | 11/2015 | Rosen | G16H 20/00 705/2 |
| 2017/0265966 | A1* | 9/2017 | Lemchen | G06Q 10/101 |

OTHER PUBLICATIONS

Noles, Jeffrey, Dentists can expect good things from cloud-based dental lab software, Dentistry iQ, Aug. 6, 2014, accessed at [https://www.dentistryiq.com/dentistry/prosthodontics-and-labratory/article/16359622/dentists-can-expect-good-things-from-cloudbased-dental-lab-software]. (Year: 2014).*

* cited by examiner

*Primary Examiner* — Jeffrey A. Smith
*Assistant Examiner* — Lindsey B Smith
(74) *Attorney, Agent, or Firm* — Polsinelli PC

(57) ABSTRACT

The disclosed technology relates to a dental relationship management system configured to provide customized content to a dental professional. The dental relationship management system is configured to provide a platform configured to facilitate processing of dental orders and store dental order information in a database. The dental relationship management system is further configured to select content for delivery based on various factors and provide the content to users of the platform.

16 Claims, 20 Drawing Sheets

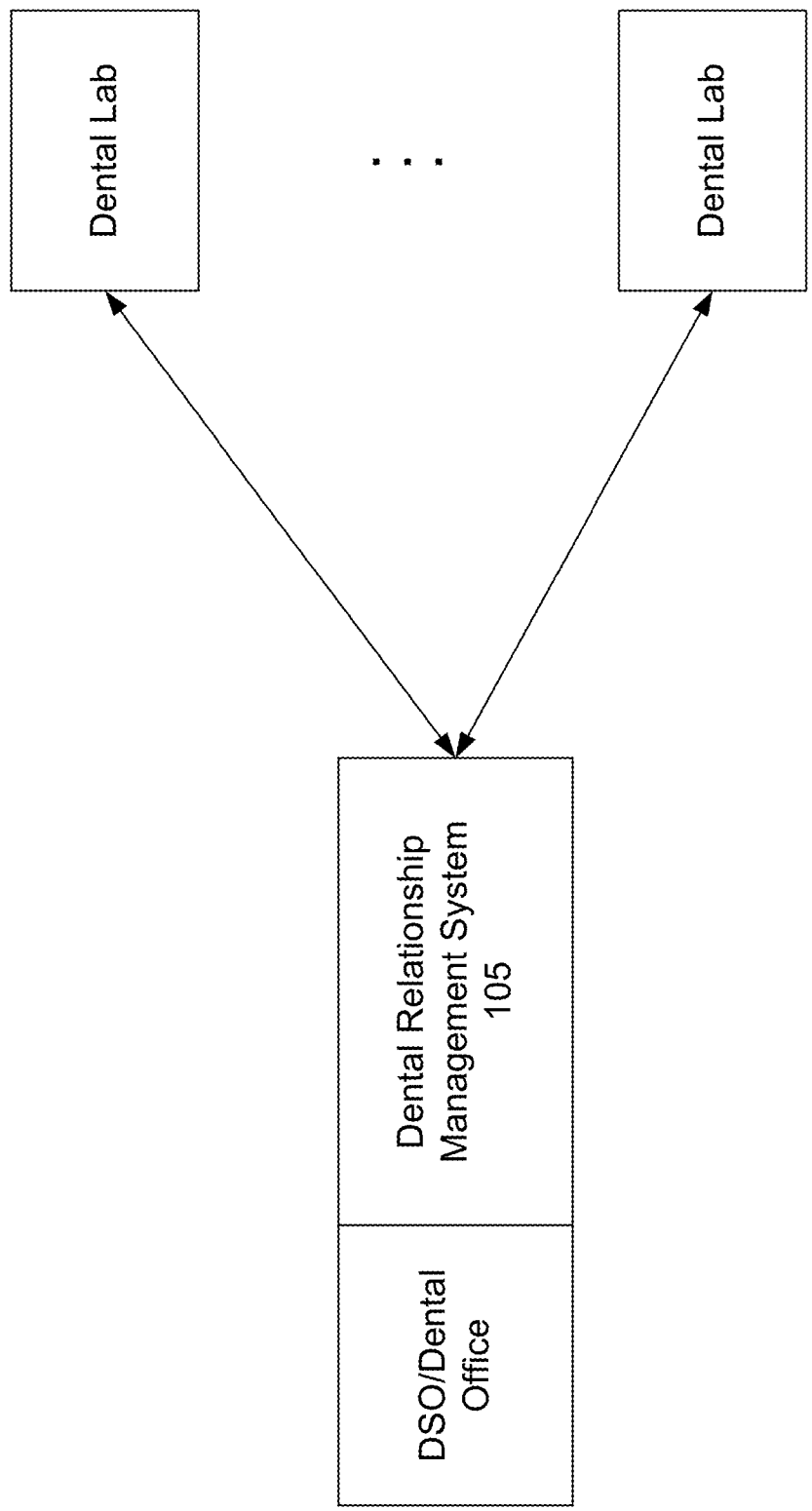

DENTAL RELATIONSHIP MANAGEMENT SYSTEM AND PROCESS

TECHNICAL FIELD

The subject matter of this disclosure relates in general to the dental industry, and more specifically to managing the relationship between a dental office and a dental laboratory.

BACKGROUND

Dental offices typically partner with dental laboratories to prepare dental products for patients. These dental products may include, for example, crowns, bridges, dentures, dental implants, orthodontics, dental restorations, or any other dental/oral products that a dentist, orthodontists, or other oral care professionals may require. Many of these products are regulated by the United States Food and Drug Administration (FDA) as medical devices and, as a result, subject to stringent requirements.

To order a dental product, one or more staff members at a dental office obtains an order form for the lab they want to prepare the product, fills out the order form, attaches any additional information (e.g., a prescription, X-rays, photos, etc.) that may be needed by the dental lab, and mails a packet containing the order form and attachments to the dental lab. When the dental lab receives the packet, a lab technician reviews the information, fabricates the dental product, and mails the product back to the dental lab.

However, there are many points in the process for difficulties to occur. For example, in many cases, communication between the dental office and the dental lab is inadequate and many lab technicians rely on contacting the dental office by phone to clarify instructions or are often forced to make decisions without necessary information. In other cases, there may be errors in forms, measurements, or in attachments to orders which cause mistakes in the dental products that need to be repaired or replaced. Often, these pain points are made worse by the time pressures of needing to have dental products ready within a short time period and, when there is a delay, not knowing the cause of the delay (and whether the delay of is caused by the dental office, the dental lab, or a third party).

BRIEF DESCRIPTION OF THE FIGURES

In order to describe the manner in which the above-recited and other advantages and features of the disclosure can be obtained, a more particular description of the principles briefly described above will be rendered by reference to specific aspects that are illustrated in the appended drawings. Understanding that these drawings depict only aspects of the disclosure and are not therefore to be considered to be limiting of its scope, the principles herein are described and explained with additional specificity and detail through the use of the accompanying drawings in which:

FIGS. 1A-1C are conceptual block diagrams illustrating example network environments that include a dental relationship management system, in accordance with various aspects of the subject technology;

FIGS. 3-14 are illustrations showing example interfaces, in accordance with various aspects of the subject technology;

DESCRIPTION OF EXAMPLE ASPECTS

Figure 1A:
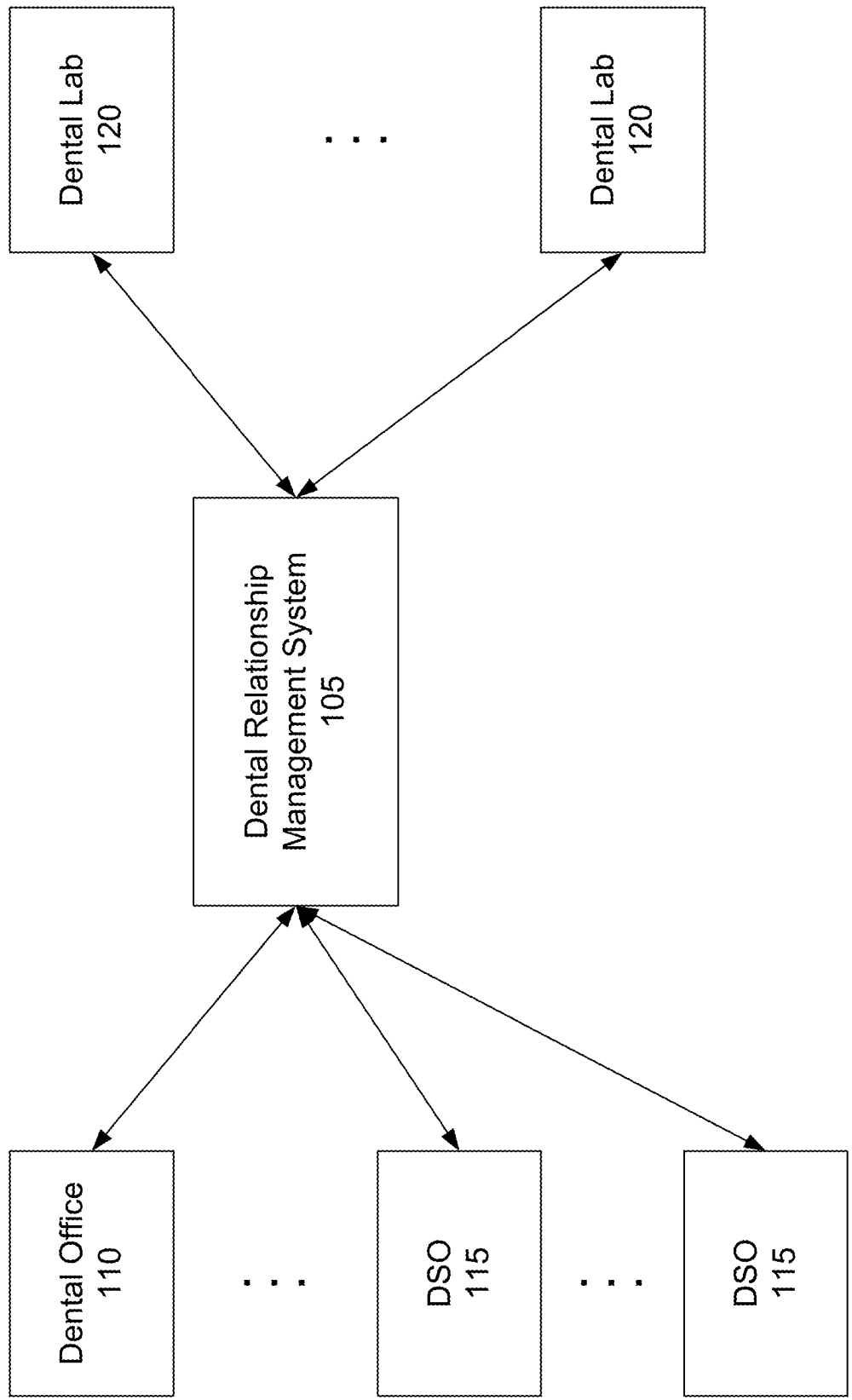

The detailed description set forth below is intended as a description of various configurations of aspects and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

It is in the best interest of dental offices, dental laboratories, and their patients that the relationship between a dental office and a dental laboratory remains strong. However, there are many areas in the relationship where miscommunication, confusion, or other errors may occur. Furthermore, when such an event occurs, it is difficult for a dental office or a dental lab to sift through the paper trail and guess whether the error occurred at their end or at the other party's end or even which party is holding up the process. This confusion may result in delays and delays may cause additional strain in the relationship. For example, a dental office may wait on the dental lab thinking the error or delay is caused by the dental lab while the dental lab may wait on the dental office thinking the error or delay is caused by the dental office.

Various aspects of the disclosed technology address the need in the art for a more effective way to process dental orders, track dental order status, and communicate with dental offices and laboratories. For example, various aspects of the disclosed technology relate to a dental relationship management system that provides a platform accessible via a network where dental office staff may submit dental orders, lab technicians can review dental orders, and users in the dental office and/or labs may track the progress of the dental orders, send and receive communications regarding the dental orders, and receive notifications or other content regarding the dental orders. The platform provides a central place where data associated with the dental orders are kept and capabilities to organize the data into insightful and/or actionable information.

In many situations, it is beneficial for dental offices and dental labs to evaluate their own performance as well as their relationships with other dental labs and dental offices. For example, in order to improve service and address staffing or process issues, a dental office may wish to determine whether delays or errors are caused by their staff (e.g., dentists, dental assistants, clerical staff, etc.) or by the dental labs they work with. They may also wish to assess the performance of various dental labs they work with in order to identify specific labs to send additional work to or labs to reduce workload. Dental labs may similarly wish to determine if delays or mistakes are caused by the dental labs or by dental offices so they can make a self-assessment to improve their service or alter processes that may improve the outcome and reduce errors made by the dental lab or the dental office.

Information about the root causes of problems, the performance of dental offices and dental laboratories, and the relationships between dental offices and dental laboratories may be especially valuable to dental service organizations (DSOs) or Federally Qualified Health Centers (FQHCs). A dental service organization may contract with one or more dental practices, each having one or more dental offices, to provide business management and support so that oral care professionals can focus on providing patients with the best oral care. Federally Qualified Health Centers are community-based and patient-directed organizations that serve certain populations and may also contract with, or otherwise be associated with, one or more dental practices to provide dental services. DSOs and FQHCs have an interest in reducing errors and increasing the efficiency of its dental offices.

Unfortunately, the information regarding the root causes of problems, the performance of dental offices and dental laboratories, and their relationships is hard to come by. Dental offices, laboratories, or DSOs/FQHCs simply are not configured to capture the entirety of this data. Questionnaires and surveys of staff are helpful, but biased because respondents typically only worked on a small sample of orders and there exists the risk that certain experiences (e.g., extremely bad or good experiences) may influence the responses more than the bulk of the experiences.

Various aspects of the disclosed technology address the need in the art for collection and analysis of data about the root causes of dental order issues, the performance of dental offices and dental laboratories, and the relationships between dental offices and dental laboratories. For example, a dental relationship management system provides a platform that monitors dental events that occur during the processing of dental orders and store the dental event information in a database.

The events may be of different event types. These event types may include, for example, new orders, case alerts, and rework events, where a dental product must be repaired, replaced, or altered. This information may be processed and provided to a user of the platform so that the user may see how many of each event type each dental office and/or each dental lab experienced and which event type occurred the most for each. Additional metrics such as order turnaround times may also be collected and provided to the user.

According to various aspects of the disclosed technology, the platform is further configured to generate customized content for the various dental offices and labs and provide the dental offices and labs with personalized, targeted content. For example, the platform may analyze orders between a dental office and a dental lab and determine that dental events of a particular type occur more than other types of dental events or exceed a threshold number.

In response, the platform may select whether the dental office, the dental lab, or both should receive targeted content based on, for example, the party that is responsible for that event type, determine what contact to deliver, and deliver the content. The content that is delivered may be configured to help improve performance or reduce mistakes in the dental office or dental lab. The content may include, for example, metrics, tips, recommendations, tutorials, alternative products or vendors, insights, or other data that may be valuable for dental professionals.

Aspects of the disclosure also address various technical obstacles rooted in computer technology and, in particular, the internet. For example, various aspects enable the platform to provide more efficient and centralized storage of data associated with the dental orders, which also allows for more efficient and convenient access to the data. In contrast to some solutions, various aspects further enable improvements in speed and reductions in computing resources needed to, for example, calculate various insights, select or generate content, generate relationship scores, entity scores, or other metrics, and provide customized content to users.

Various aspects of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Figure 1C:
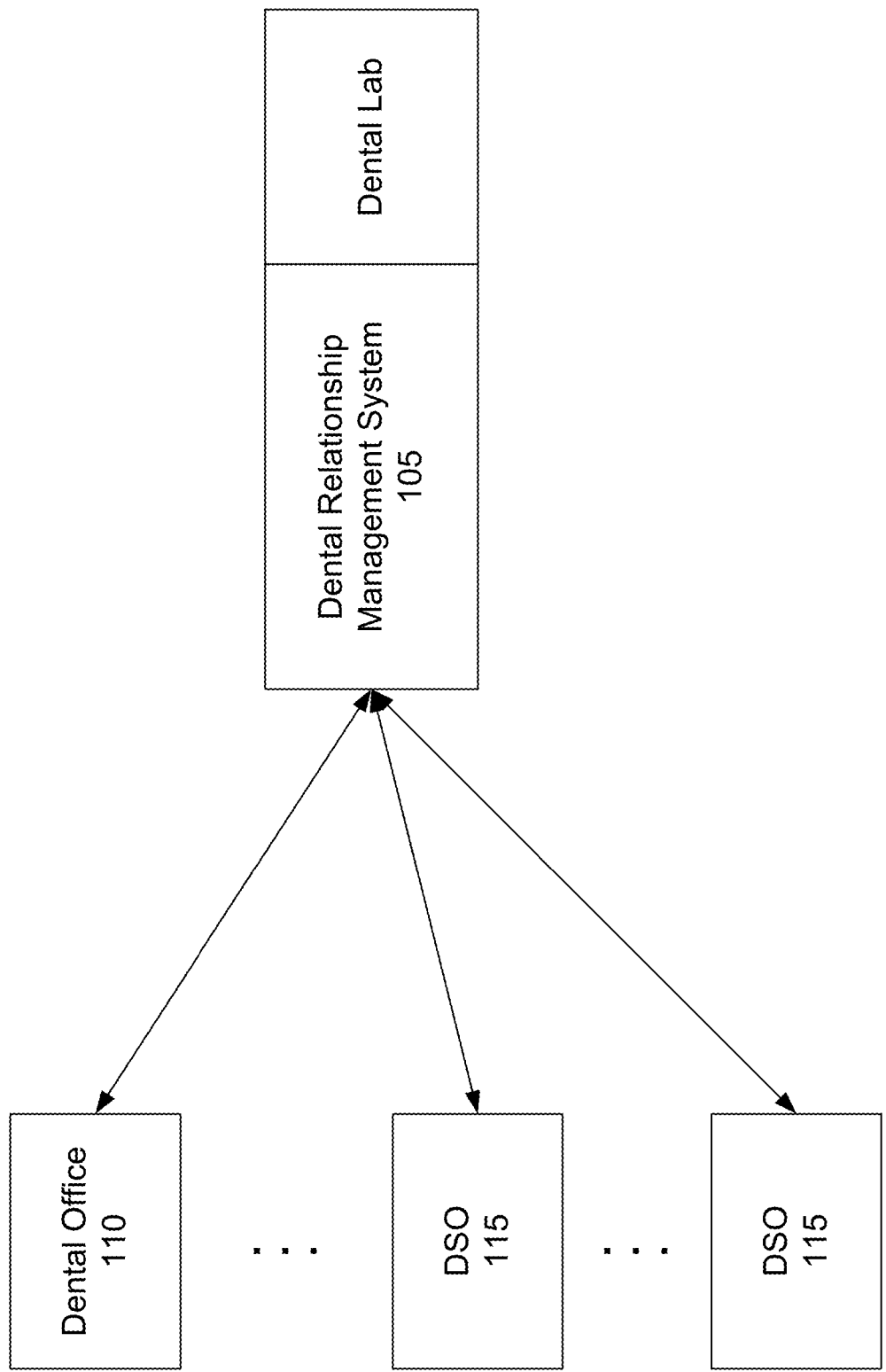

FIGS. 1A-1C are conceptual block diagrams illustrating example network environments that include a dental relationship management system, in accordance with various aspects of the subject technology. Although some aspects of the disclosure relate to a client-server network environment, other aspects may include other configurations including, for example, peer-to-peer environments or single-system environments.

The network environments include a dental relationship management system 105, one or more dental offices 110 or dental service organizations (DSOs) 115 or FQHCs (not shown), and one or more dental laboratories 120. Each dental office 110 or DSO 115 may include one or more machines (e.g., a computer, server, laptop, mobile device, smart device, etc.) configured to communicate with the dental relationship management system 105. Similarly, each dental lab 120 may include one or more machines configured to communicate with the dental relationship management system 105.

The dental relationship management system 105 is configured to create dental orders for dental products, track dental orders, and receive updates regarding the dental orders from the dental offices 110, DSOs 115, and dental labs 120. The dental relationship management system 105 is further configured to monitor various metrics for the dental offices 110, DSOs 115, and dental labs 120, generate metrics, insights, recommendations, or other content for the dental offices 110, DSOs 115, and dental labs 120, and deliver the content to the dental offices 110, DSOs 115, and dental labs 120. The metrics may relate to the performance of particular organizations (e.g., the dental offices 110, DSOs 115, or dental labs 120) or the relationships between two or more organizations.

The network environment in which the dental relationship management system 105 operates may be varied. For example, FIG. 1A illustrates a network environment, in accordance with various aspects of the subject technology, where a dental relationship management system 105 may support one or more dental offices 110 or DSOs 115 as well as one or more dental labs 120. The dental relationship management system 105 is shown separate from the dental offices 110, DSOs 115, and dental labs 120 and may be seen as a cloud service by the dental offices 110, DSOs 115, and dental labs 120.

In FIG. 1B, the dental relationship management system 105 is shown as being associated with a DSO, dental office, or dental practice. The dental relationship management system 105 may be owned by the dental organization and/or be implemented on one or more machines owned or managed by the dental organization or the dental organization may contract with a service provider for services provided by the dental relationship management system 105. In this configuration, the dental relationship management system 105 may serve the dental organization in managing dental orders, monitoring metrics related to the dental organization and each relationship the dental organization has with the different dental labs that the dental organization uses, and delivering valuable content to the dental organization.

In FIG. 1C, the dental relationship management system 105 is shown as being associated with a dental lab. The dental relationship management system 105 may be owned by the dental lab and/or be implemented on one or more machines owned or managed by the dental lab or the dental lab may contract with a service provider for services provided by the dental relationship management system 105. In this configuration, the dental relationship management system 105 may serve the dental lab in managing dental orders, monitoring metrics related to the dental lab and each relationship the dental lab has with the different dental offices, DSOs, or other dental practices that the dental organization uses, and delivering valuable content to the dental lab.

In some aspects, communications between the dental offices, 110, the DSOs 115, the dental laboratories 120 and the dental relationship management system 105 occur over a network. The network can be any type of network and may include, for example, any one or more of a cellular network, a satellite network, a personal area network (PAN), a local area network (LAN), a wide area network (WAN), a broadband network (BBN), the Internet, and the like. Network can be a public network, a private network, or a combination thereof. Communication network may be implemented using any number of communications links associated with one or more service providers, including one or more wired communication links, one or more wireless communication links, or any combination thereof. Additionally, network can be configured to support the transmission of data formatted using any number of protocols.

Figure 2:
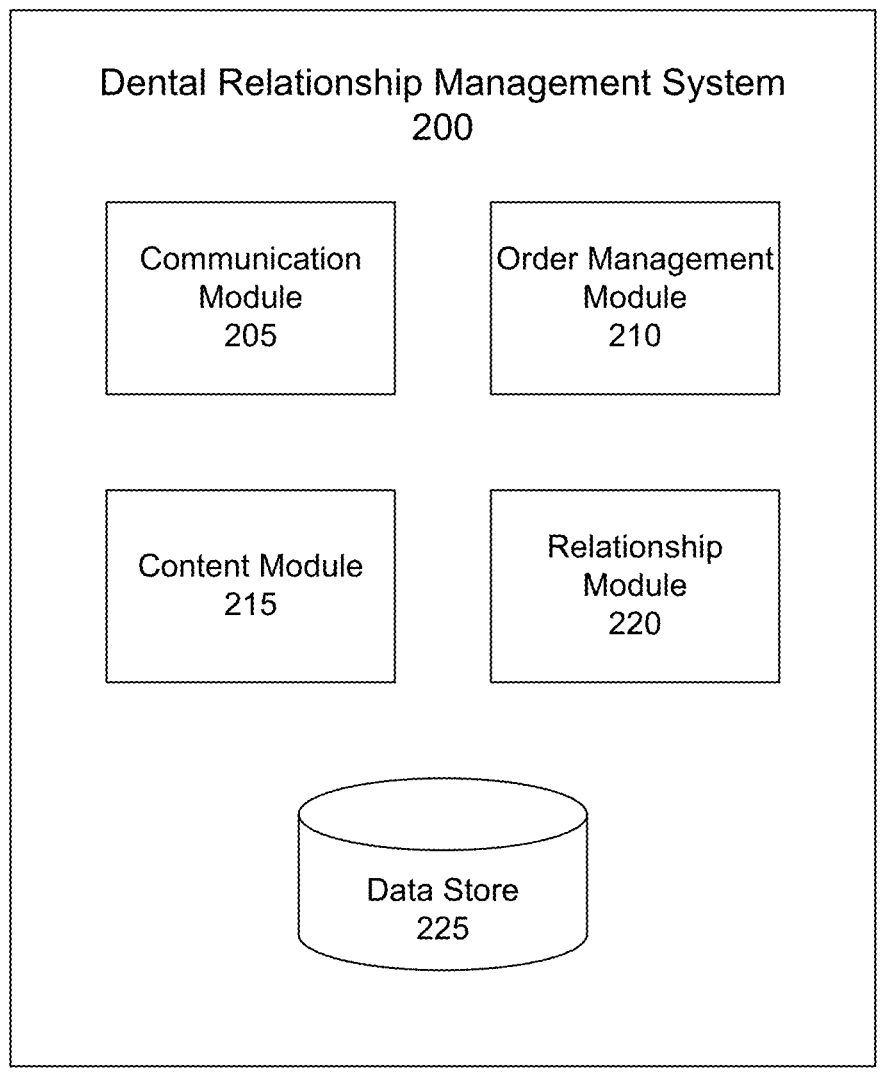
FIG. 2 is a conceptual block diagram illustrating an example dental relationship management system, in accordance with various aspects of the subject technology.

FIG. 2 is a conceptual block diagram illustrating an example dental relationship management system 200, in accordance with various aspects of the subject technology. The dental relationship management system 200 may include a communication module 205, an order management module 210, a content module 215, a relationship module 220, and a data store 225. The communication module 205 may be configured to communicate with the dental offices, DSOs, and dental labs. In some aspects, the communication module 205 may include a network interface to communicate with other machines associated with the dental organizations via a network.

The order management module 210 is configured to receive dental orders, track the dental orders through processing, and receive updates or other communications from the various dental organizations. For example, the order management module 210 may track dates and times dental orders are received, moved from one stage of processing to the next, or delivered. The number, type, and timing of messages and other events such as case alerts or rework cases may also be tracked. As will be described in further detail below, a case alert may include any event that may cause a dental order to be delayed or require subsequent communication between the dental lab and a dental office before the order can be fulfilled or completed. A rework case may involve orders where the dental product was fabricated and delivered to the dentist office, however, for some reason, the dental product needs to be repaired, redone, or otherwise reworked.

The content module 215 is configured to determine whether to deliver content to one of the various dental organizations, identify specific dental organizations to deliver content to, and select and/or generate appropriate content for delivery. The content may include, for example, notifications, reminders, metrics, insights, tutorials, recommendations, or any other content that can be delivered.

The relationship module 220 is configured to calculate various metrics and scores for dental offices and/or dental labs with respect to dental orders. According to various aspects, the relationship module 220 may calculate relationship scores between a dental office and a dental lab. According to various aspects, additional or alternative relationship scores may also be calculated. For example, relationship scores between a dentist and a dental lab, a dental practice and a dental lab, or a particular member of the dental staff and a dental lab may be calculated.

The relationship module 220 may also calculate entity scores for the dental office, the dental lab, dentist, or other entity associated with the dental order process. In some aspects, the entity score may be calculated based on the aggregated relationship scores associated with that entity. For example, an entity score for a dental lab may be calculated based on the relationship scores for that dental lab and the various dental offices, dentists, practices, or dental office staff. An entity score for a dental office may be calculated based on the relationship scores for that dental office and the various dental labs. According to various aspects, additional or alternative entity scores may also be calculated. For example, the relationship module 220 may further be configured to calculate entity scores for the dentist, dental practice, dental staff member, or other entities associated with the dental order process.

The data store 225 is configured to store various pieces of information needed by the dental relationship management system 200. For example, the data store 225 may store communications transmitted and received by the communication module 205, dental order information and other tracked data used by the order management module 210, content used by the content module 215, and/or metrics and scores used by the relationship module 220. The data store 225 may be implemented in various ways. For example, the data store 225 may include one or more relational databases, noSQL databases, distributed file systems, or a combination of data stores.

According to various aspects of the subject disclosure, the dental relationship management system 200 may provide an interface for dental office personnel or dental lab personnel to submit dental orders for dental products, update dental orders, input other information associated with dental orders (e.g., attachments, diagrams, prescriptions, x-rays, etc.), send and receive messages associated with dental orders, view the status of one or more dental orders, receive notifications, reminders, or updates for dental orders, and/or view or receive content (e.g., insights, recommendations, tutorials, relationship scores, entity scores, performance metrics, etc.). The interface may be implemented as, for example, a portal, a website, a mobile or desktop application, a text or instant messaging interface, an email interface, or a combination of interfaces that uses multiple communication channels.

Figure 3:
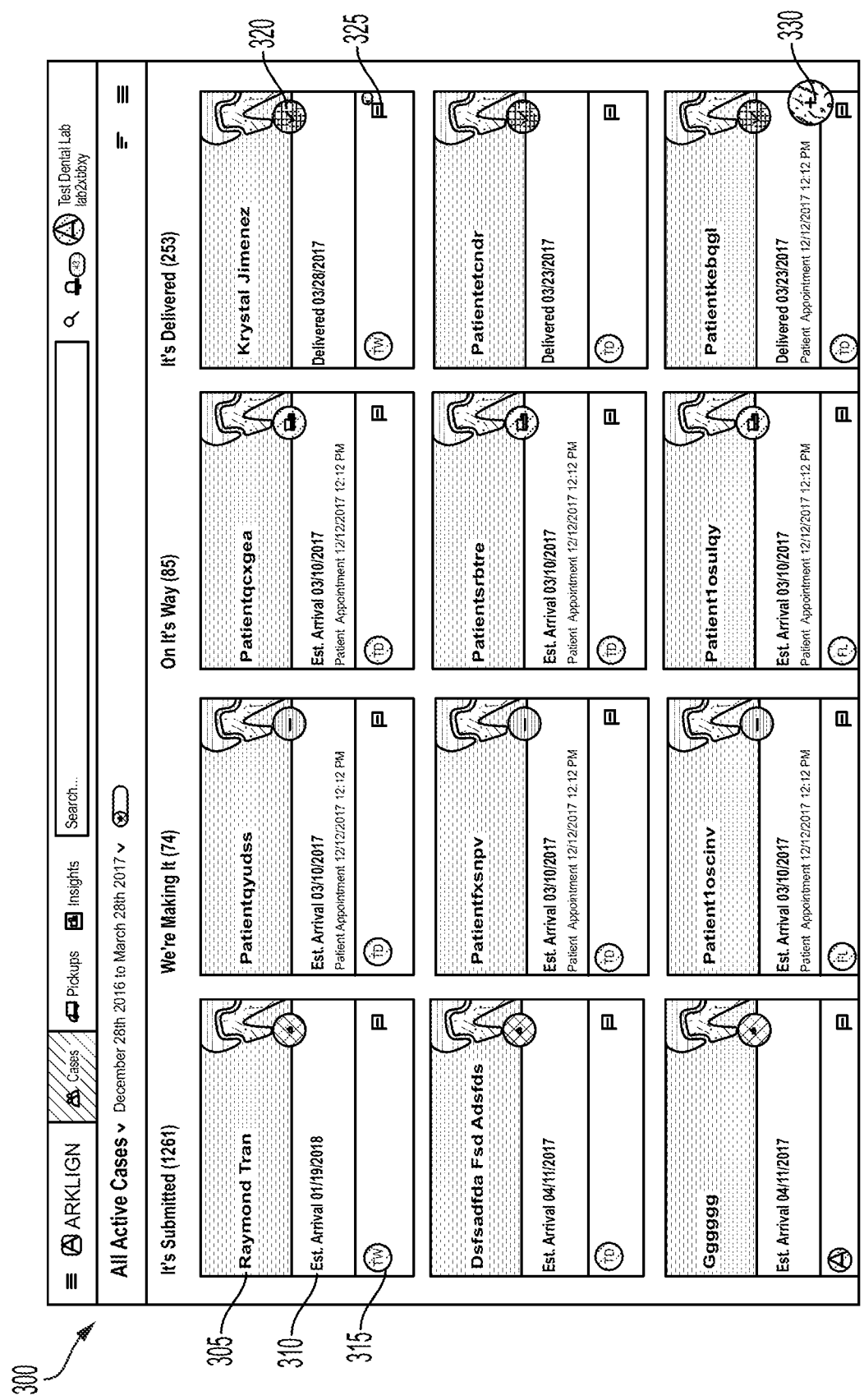

FIG. 3 is an illustration showing an example interface 300, in accordance with various aspects of the subject technology. The example interface 300 provides a way for users (e.g., dental professionals) to access the platform provided by the dental relationship management system. Although FIG. 3 illustrates an interface 300 where personnel associated with a dental lab may log in and view cases associated with the dental lab, the dental relationship management system may also provide interfaces where personnel associated with a dental office, dental practice, or DSO may log in and view cases associated with their organization.

As shown, personnel associated with a dental lab may log in and view a summary of cases being handled by the dental lab in the interface 300. The interface 300 may provide various ways of searching and filtering cases (e.g., dental orders for dental products) based on status, date, patient name, dentist, dental office, or dental practice, or any other information that may be used to locate or filter dental orders. For example DSOs, FQHCs, or dental practices with multiple offices may select cases to view for one or more dental offices that the organization is associated with. In some aspects, the cases may further be filtered by dental staff, dentists, or other professionals.

The summary may include a number of dental case records 305 which may include a patient identifier 305 (e.g., a patient name, identification number, or other identifier), a timeframe 310 for starting or completing a stage, a dental office identifier 315 to indicate the source of the dental order, an indicator of the stage of the dental order 320, and an indicator 325 of whether there are new messages, notifications, or content to view for the specified dental order. A user may also be able to create a new dental order by selecting interface component 330.

Using the interface 300 shown in FIG. 3, a user may quickly locate a dental order and determine its status (e.g., whether it has been submitted, in the making or fabricating process, whether it is being delivered, or whether it has been delivered) based on the organization of the interface 300 as well as the indicator of the stage of the dental order 320. A user may view more information associated with a specific dental order by selecting a dental case record 305 and causing a subsequent interface to display additional information associated with the selected dental case record 305.

The platform provided by the dental relationship management system may also enable users to select dental orders and order rework events, invoke case alerts, or create other events associated with the selected dental orders. A user may, for example, select a dental order to be reworked or to issue a case alert for, indicate a reason or category (e.g., an event subtype) for the case alert, rework, or other event and input other information associated with the case alert, rework, or other event. The progress of these events may be similarly tracked on the platform by all parties involved.

Figure 4:
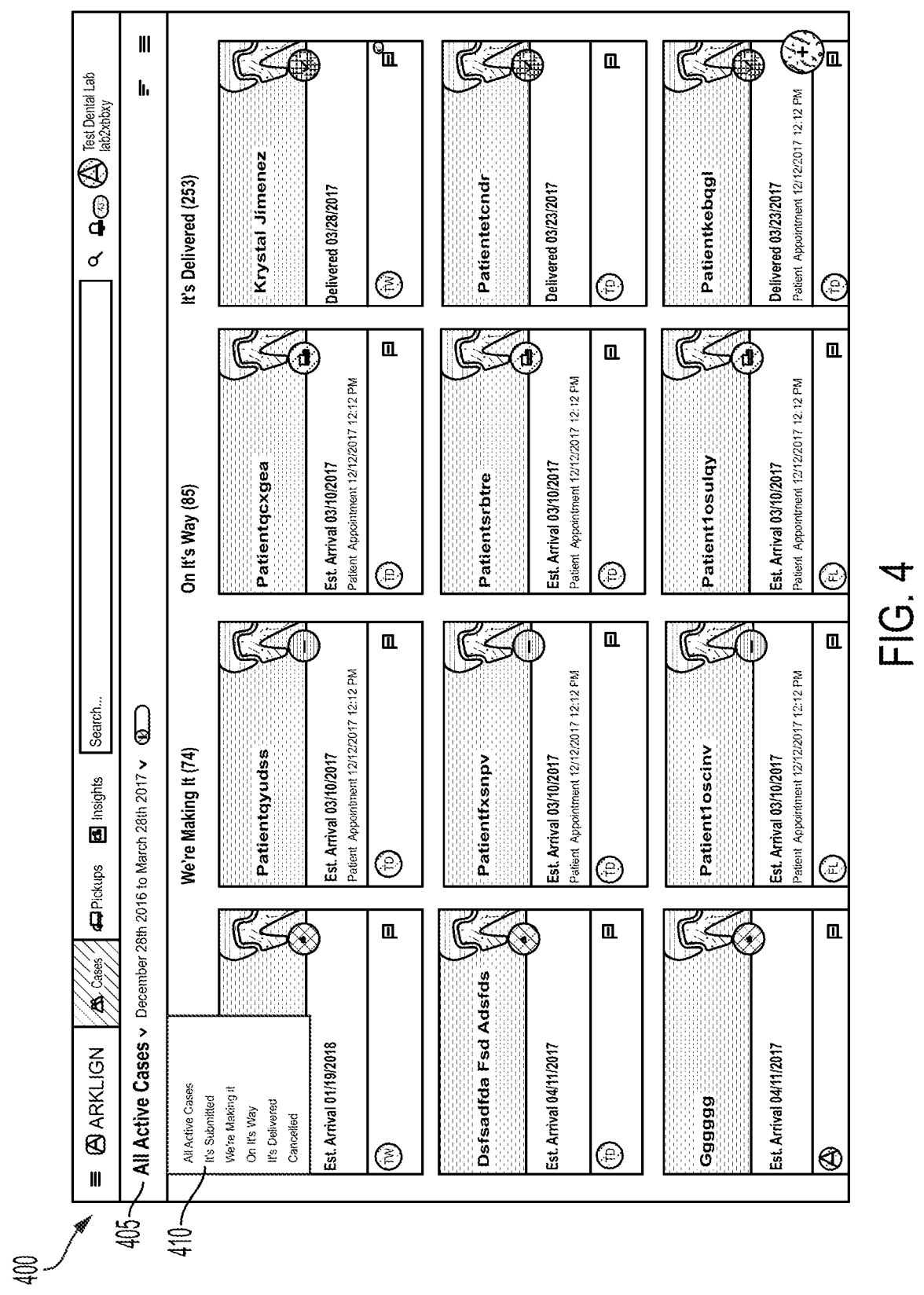

FIG. 4 is an illustration showing an example interface 400, in accordance with various aspects of the subject technology. In interface 400, a user may further select a category of dental orders to view using a drop down menu button 405. Once a user selects the drop down menu button 405, the user may select the category or status of dental orders to view in the drop down menu 410.

Figure 5:
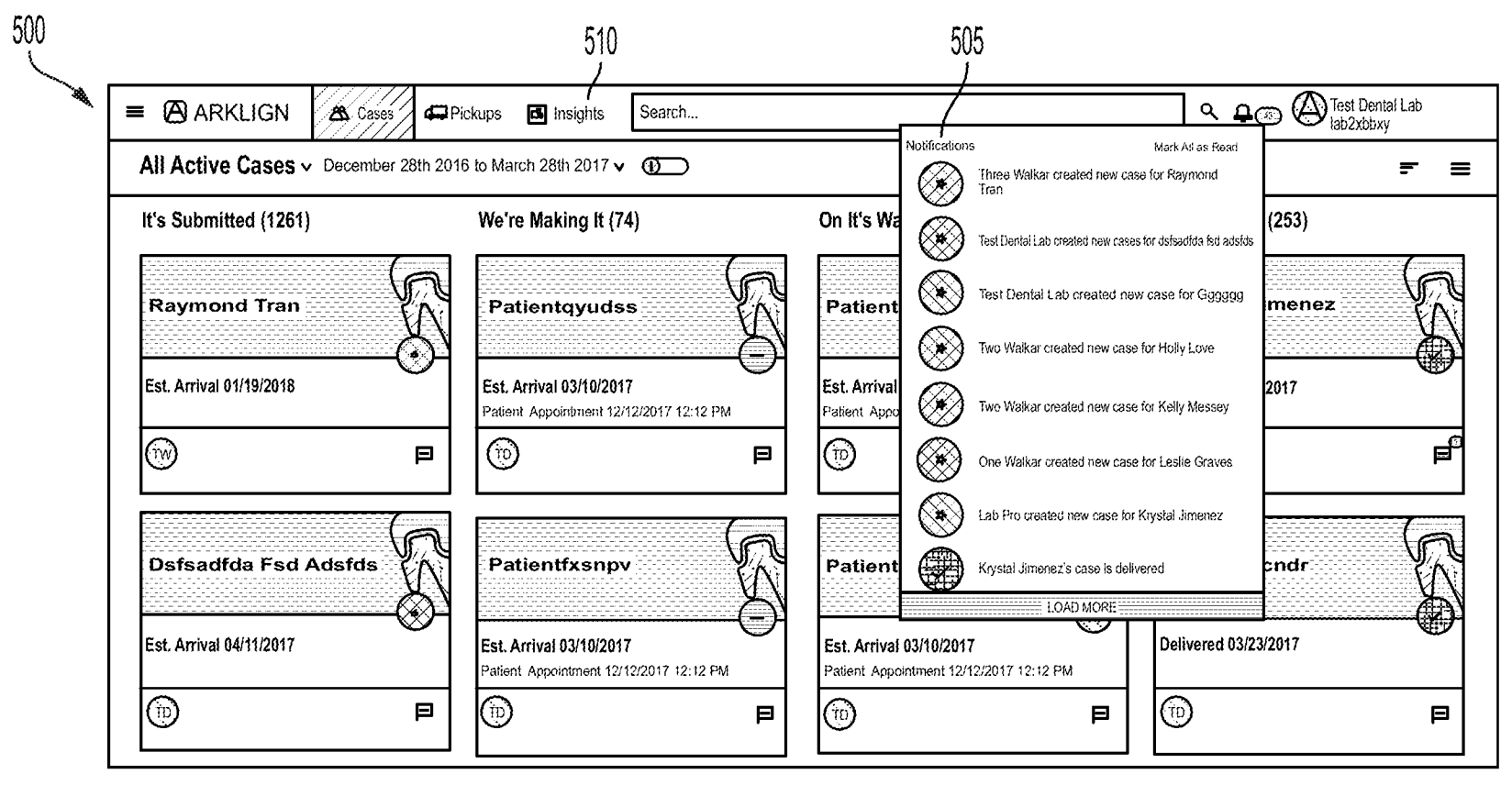

The platform provided by the dental relationship management system may also be configured to deliver notifications, message, insights, metrics, and other content to users. FIG. 5 is an illustration showing an example interface 500, in accordance with various aspects of the subject technology. Interface 500 includes a notification component 505 that includes notifications for status updates for orders, new messages, new insights, or other content. According to various aspects of the subject disclosure, notifications and other content may also be delivered through other communication channels such as instant messages, texts, emails, app notifications, or other channels.

Figure 6:
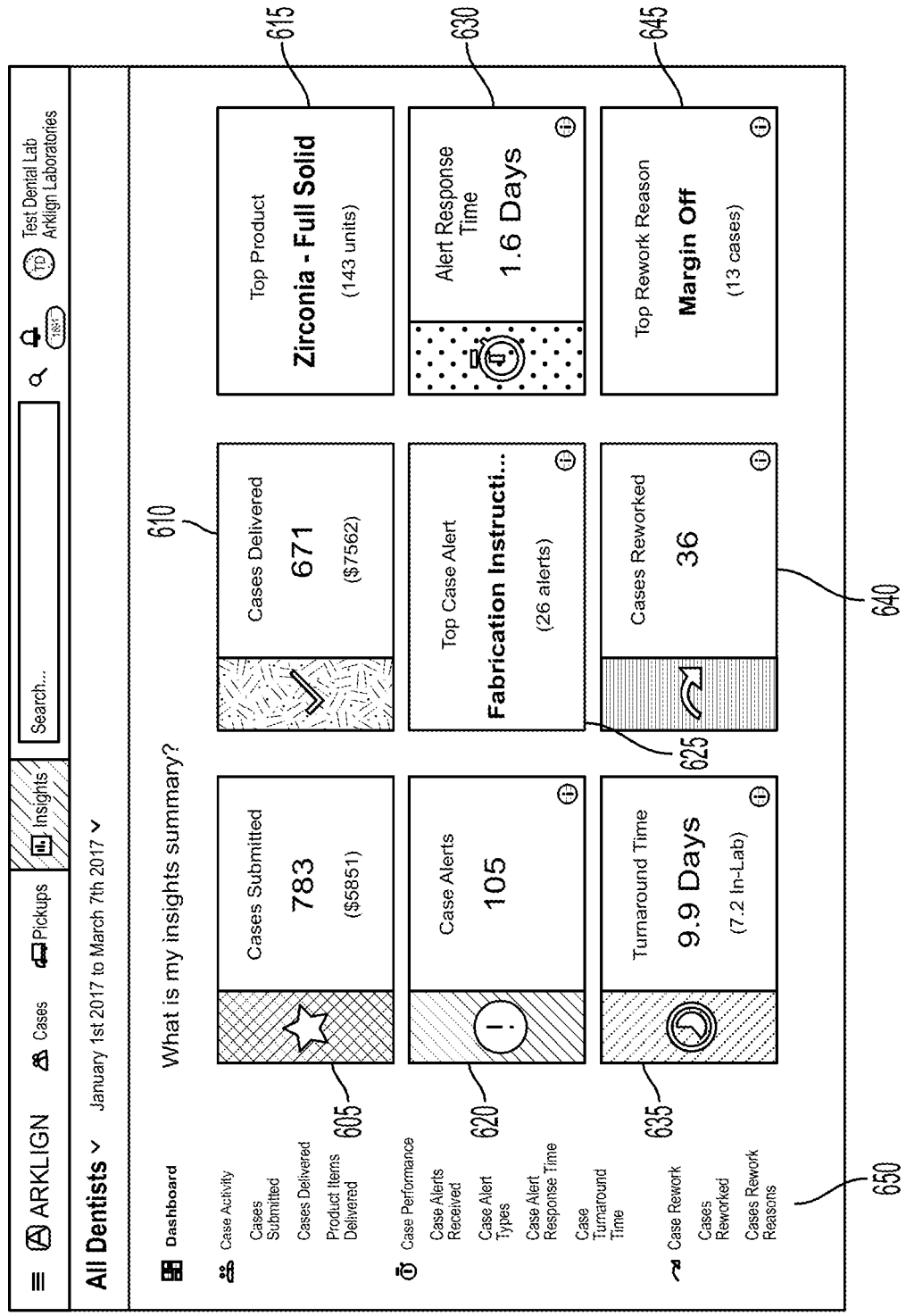

According to various aspects, the platform may also provide a dashboard that provides a view of various insights and metrics. A user may, for example, select the insights interface component 510 in FIG. 5 to go to an insights dashboard. FIG. 6 is an illustration showing an example insights interface 600, in accordance with various aspects of the subject technology. Interface 600 includes a dashboard summary of some of the insights that may be provided to a user. The insights may include, for example, a number of orders (e.g., cases) that have been submitted within a time period 605, a number of orders that have been delivered 610 within a time period, a top product that was ordered 615 within the time period, a number of case alerts received within a time period 620, and/or a top case alert 625, and an average alert response time for those case alerts 630.

A case alert may include any event that may cause a dental order to be delayed or require subsequent communication between the dental lab and a dental office before the order can be fulfilled or completed. Case alerts may occur when, for example, fabrication instructions for a dental product are unclear, the framework or clasp design is unclear, intraoral scans were unclear, implant parts were not provided, there is limited occlusal clearance, there are additional instructions suggested by a lab technician, there are unaddressed remarks made by a party, photos provided for approval have yet to be approved, the margin for a dental product is unclear, required information has not been provided, when the product type requested is unclear, when a model or impression provided is unclear, when a model, impression, or tooth is damaged, when implant parts have not been provided by the dental office or a vendor, when a bite registration has not been provided, a shade or color of the dental product was unclear or unspecified, an opposing was not included, the product type was unclear, the prescription was missing or illegible, or any other condition that may cause an order to be delayed. The delay associated to the case alert may be associated with a particular party (e.g., the dental office, the dental lab, or the vendor). However, in other cases, the case alert may not necessarily be associated with any party. Each of the types of case alerts may further include a set of further sub-categories of case alerts.

Additional insights provided by the platform may include, for example, an average turnaround time for dental orders 635, a number of dental orders reworked 640, and a top reason for reworks 645. A reworked dental order includes orders where the dental product was fabricated and delivered to the dentist lab, however, for some reason, the dental product needs to be repaired, redone, or otherwise reworked. There may be several reasons for a dental order being reworked. These reasons may include, for example, that the margin or occlusion was off, the dental product does not fit, the dental product was fractured or defective when it arrived, the anatomy was poor, the design was off, a clasp needs repair, a portion of the dental product was defective, the interproximal contact was off, the shade or color was off, there are new or changed instructions, or for any other reason a dental product might need to be reworked. Each of the types of reworks may further include a set of further sub-categories of reworks.

Figure 7:
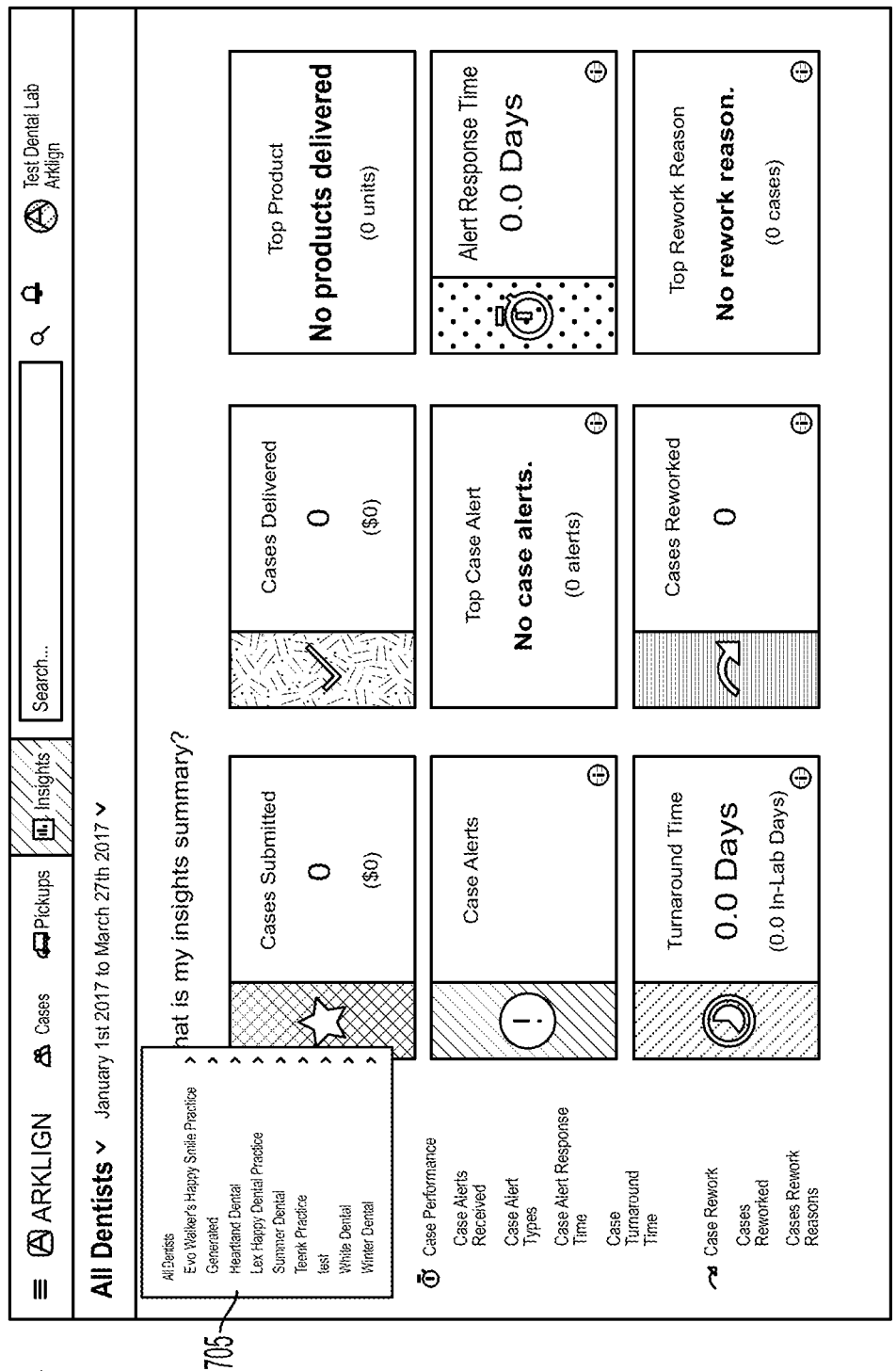

A user may further filter insights or search for particular insights based on, for example, a desired time period, a dental practice, dentist, dental office, or DSO, or by any other information tracked by the dental relationship management system. FIG. 7 is an illustration showing an example insights interface 700, in accordance with various aspects of the subject technology. Interface 700 shows the ability to filter insights by selecting a dentist in the drop down menu 705.

Although various insights are shown in interface 600 in FIG. 6, additional or alternative insights may also be provided. The insights may relate to various metrics associated with dental orders submitted or delivered, case alerts, case reworks, or turnaround times. Additional insights with respect to relationship scores, entity scores, or related metrics may also be provided. The platform provided by the dental relationship management system may also enable a user to obtain additional information about the insights 605-645 shown on the dashboard summary. For example, the user may select any of the insights 605-645 or links on the vertical panel 650 to view additional insights related to dental orders.

Figure 8:
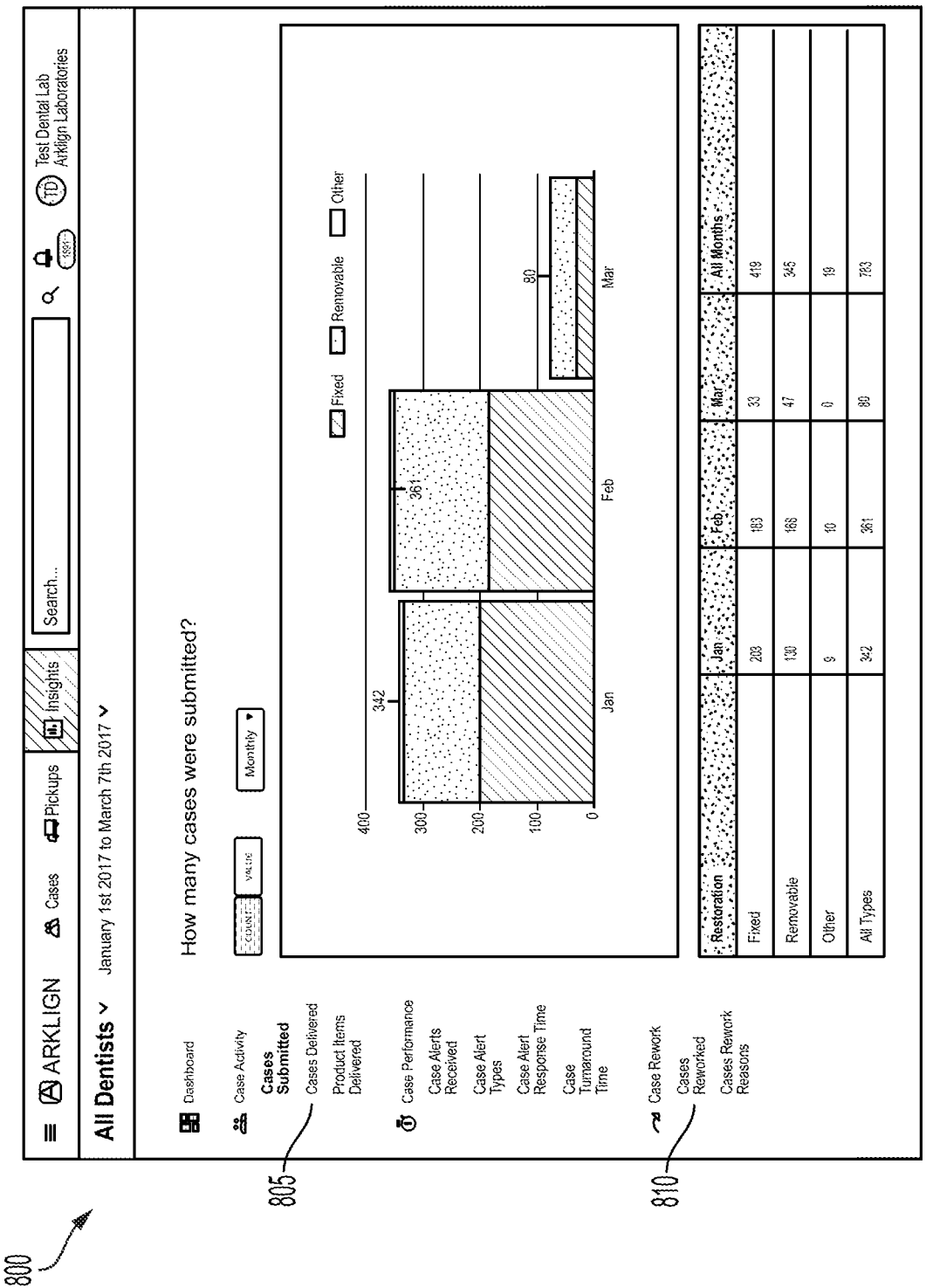

FIG. 8 is an illustration showing an example interface 800, in accordance with various aspects of the subject technology. The interface 800 displays additional insights with respect to the number of orders submitted within a particular time period. The insights may be presented in various visualizations (e.g., charts, spreadsheets, diagrams, etc.) and break down different categories of dental products. The insights may include one or more views that may be selected by the user. For example, interface 800 allows the insights displayed to be displayed based on a count (e.g., the number of orders submitted) or a value (e.g., the monetary value of the orders). Similar insights may be displayed with respect to delivered orders if, for example, a user selected the link to insights related to delivered orders 805 or with respect to cases reworked if the user selected the link related to cases reworked 810.

Figure 9:
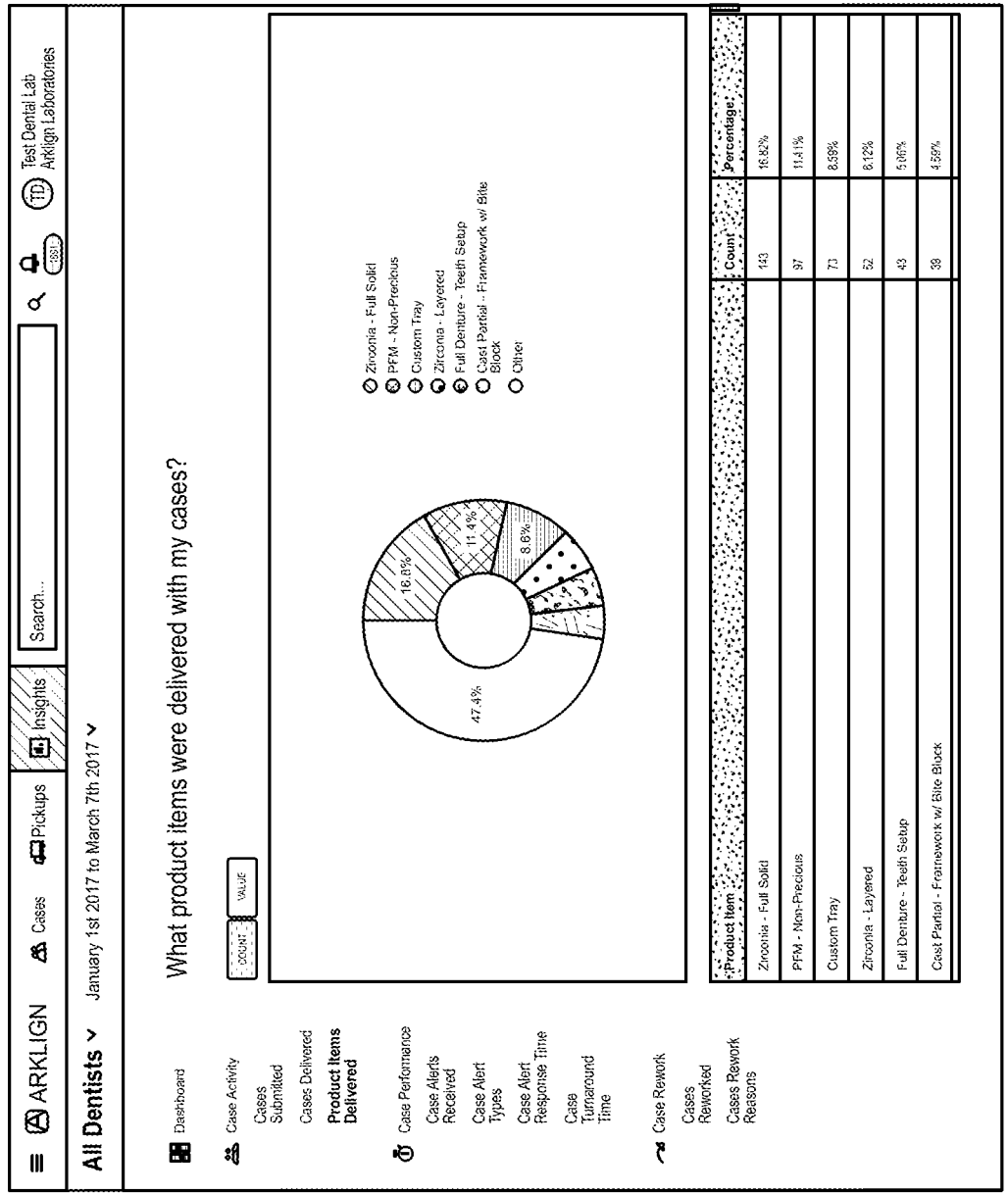

FIG. 9 is an illustration showing an example interface 900, in accordance with various aspects of the subject technology. The interface 900 displays additional insights with respect to which products were ordered or delivered. The interface 900 may be displayed in response to the user selecting, for example, interface element 615 in FIG. 6 corresponding to a top product that was ordered. The insights may include a breakdown of the dental products that were ordered and include one or more views (e.g., by count or by value) that may be selected by the user.

Figure 10:
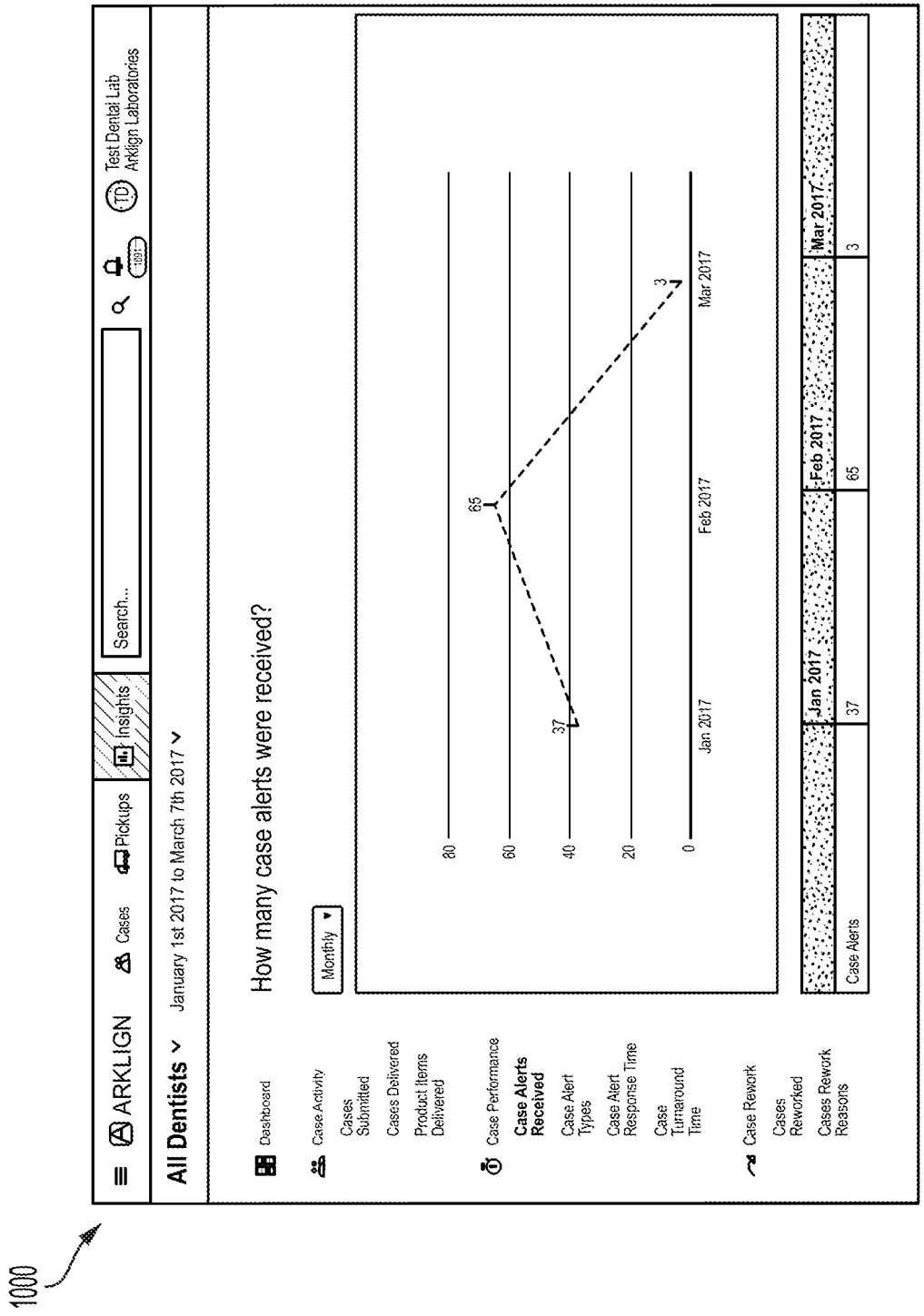

FIG. 10 is an illustration showing an example interface 1000, in accordance with various aspects of the subject technology. The interface 1000 displays additional insights with respect to a number of case alerts received over a timer period. For example, interface 1000 shows a chart mapping the number of case alerts received over time.

Figure 11:
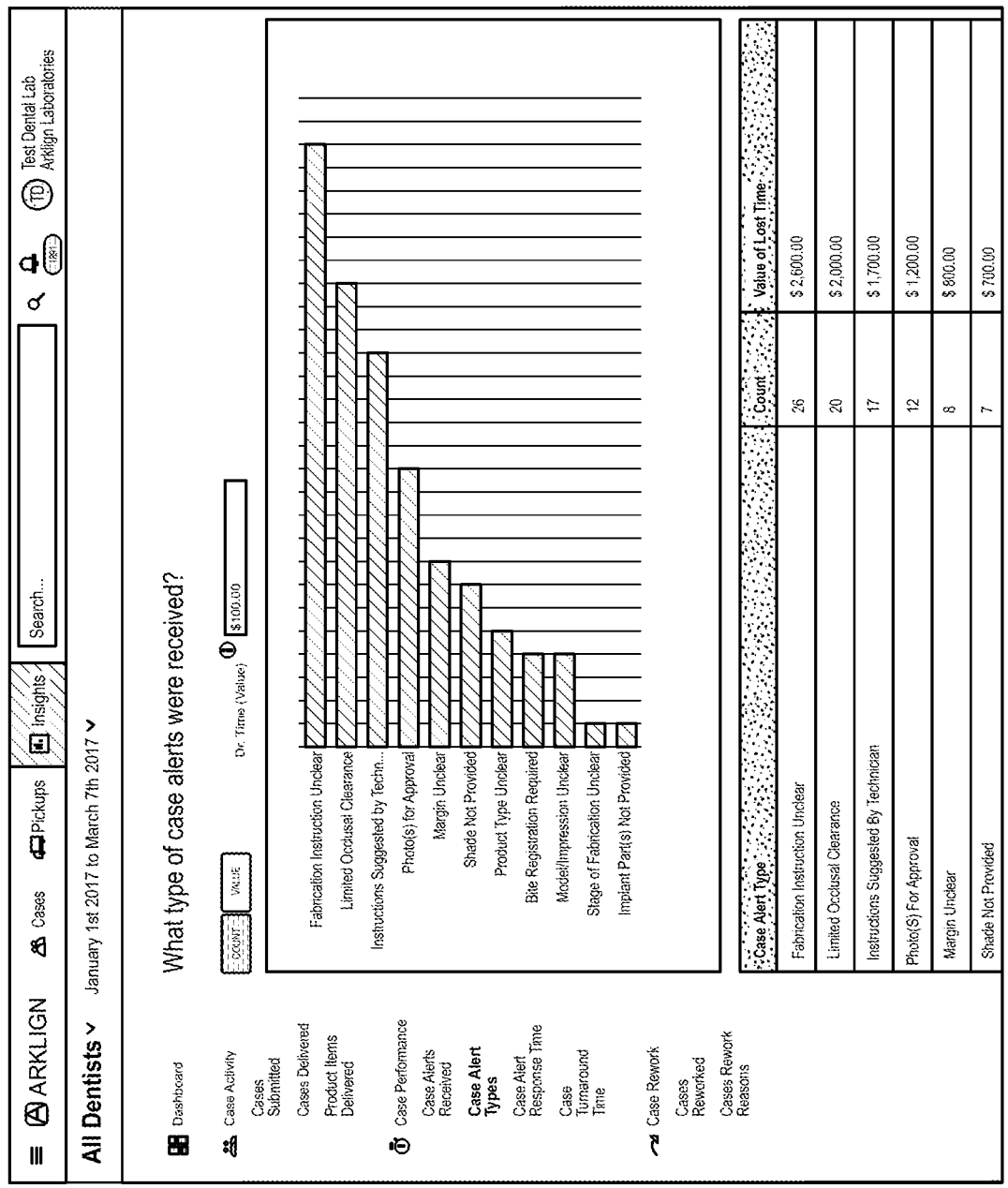

FIG. 11 is an illustration showing an example interface 11000, in accordance with various aspects of the subject technology. The interface 1100 displays additional insights with respect to the types of case alerts that were received. For example, interface 1100 shows a chart visualizing the number of each type of case alerts received.

Figure 12:
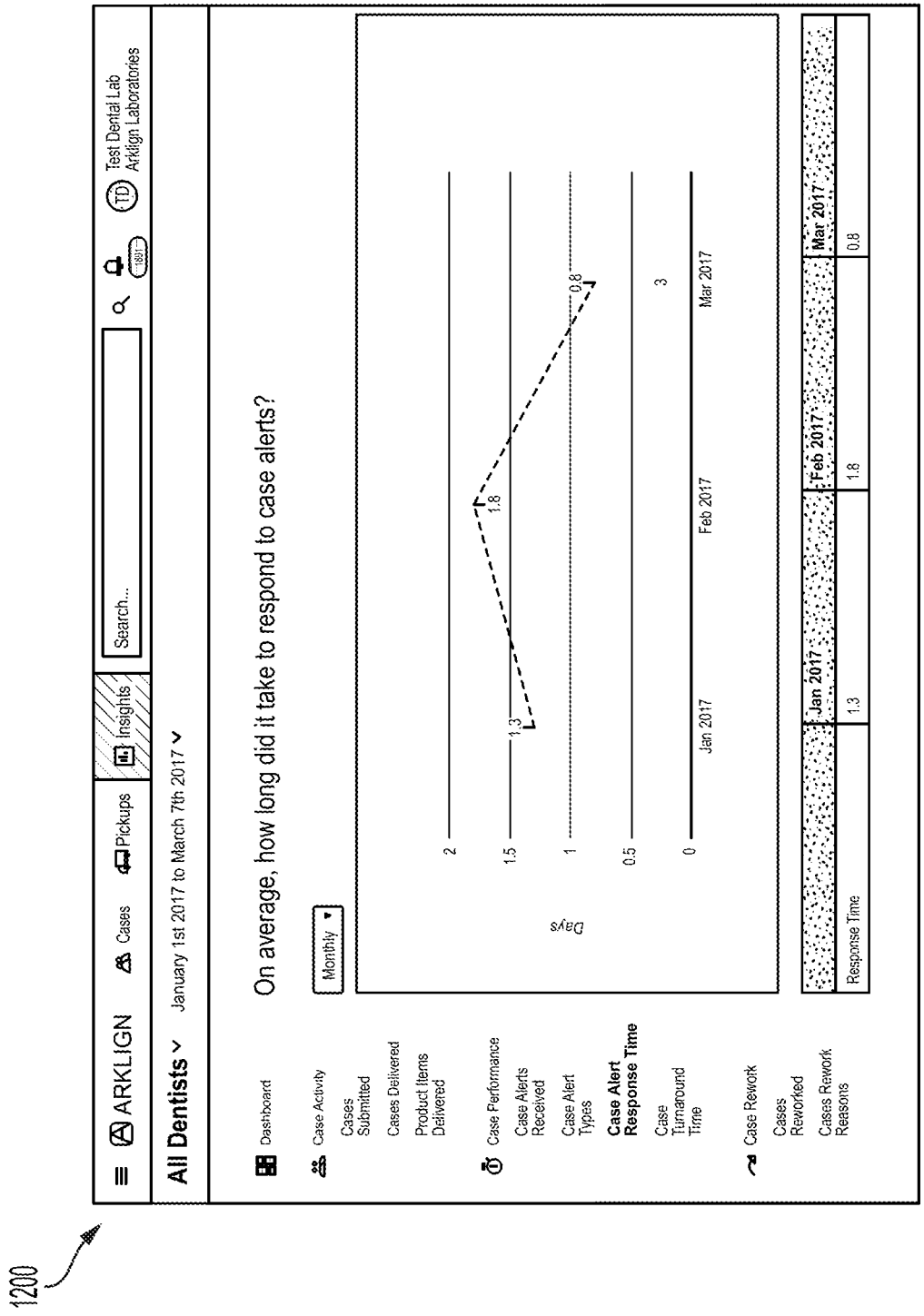

FIG. 12 is an illustration showing an example interface 1200, in accordance with various aspects of the subject technology. The interface 1200 displays additional insights with respect to an average response time for case alerts over a timer period. For example, interface 1000 shows a chart mapping the average response time for case alerts over time.

Figure 13:
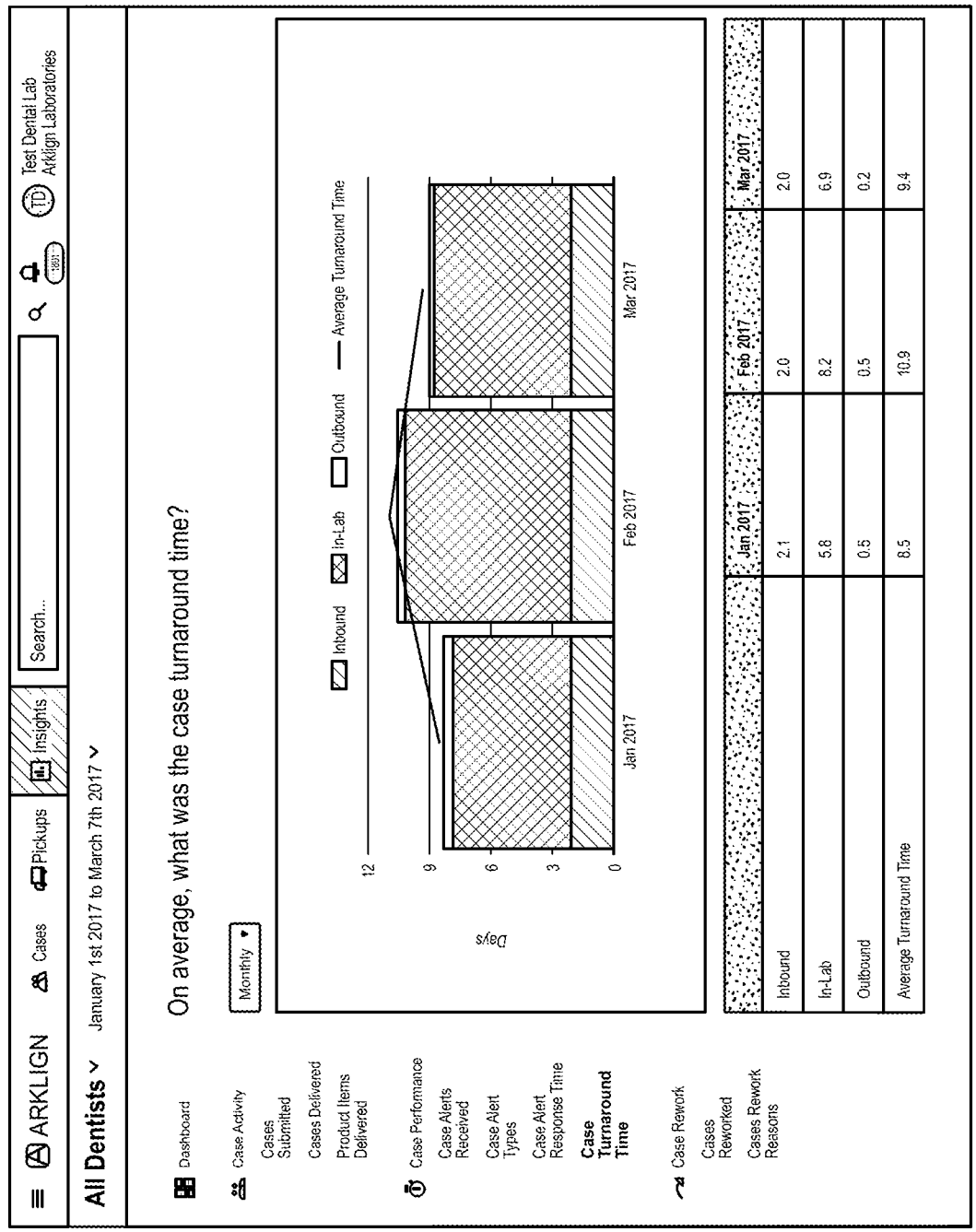

FIG. 13 is an illustration showing an example interface 1300, in accordance with various aspects of the subject technology. The interface 1300 displays additional insights with respect to an average turnaround time for dental orders over a timer period. For example, interface 1300 shows a chart mapping the average turnaround time for dental orders over a timer period.

Figure 14:
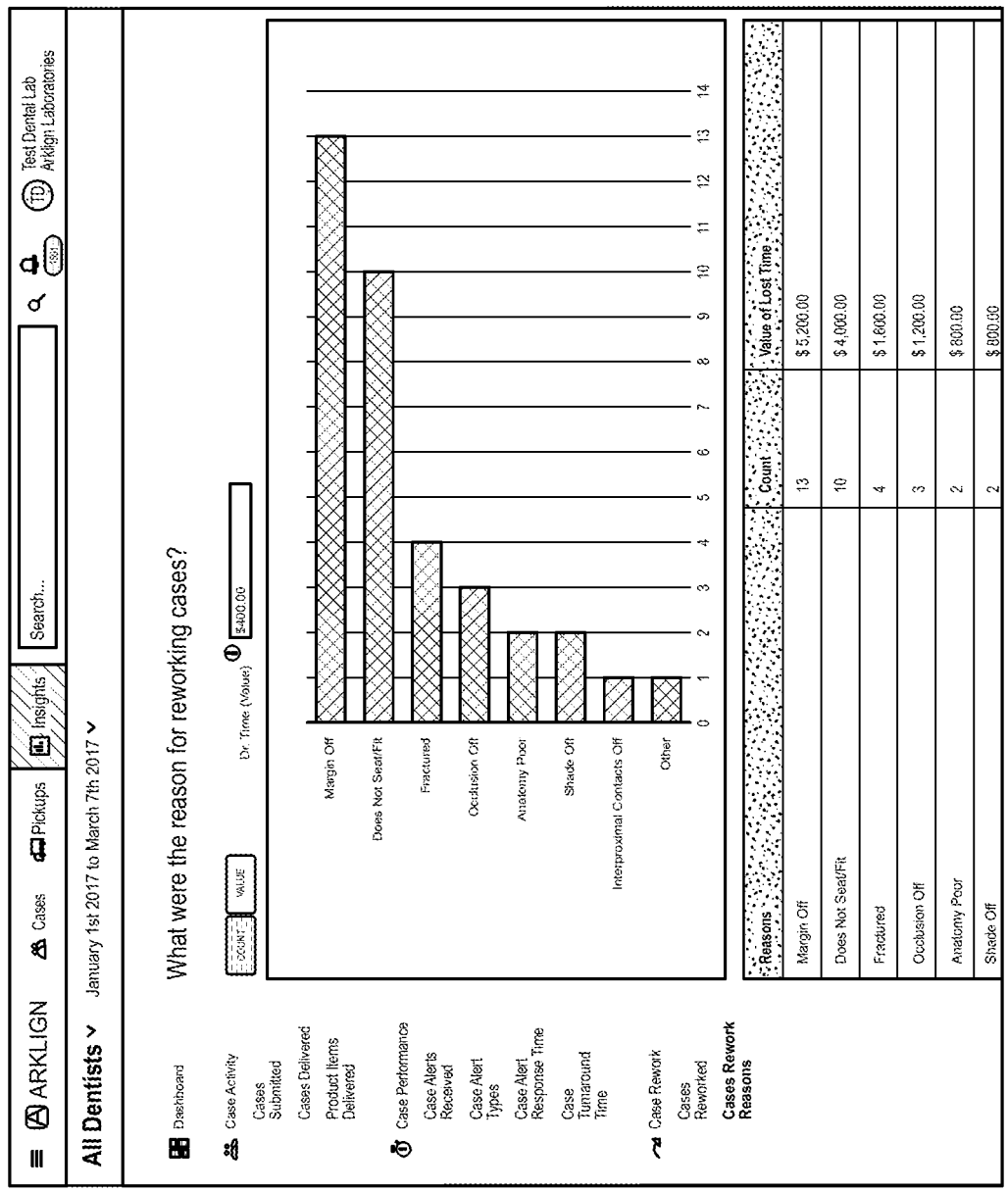

FIG. 14 is an illustration showing an example interface 14000, in accordance with various aspects of the subject technology. The interface 1400 displays additional insights with respect to reasons that orders were reworked. For example, interface 1100 shows a chart visualizing the number for each reason for a rework order or category of rework orders.

Accordingly, the dental relationship management system may be configured to provide a platform where users may create, view, manage, update, track, and troubleshoot their dental orders. The platform may allow the ordering party (e.g., the dentist office) and the fulfilling party (e.g., the dental lab) to communicate with one another, gain clarification on certain issues and/or resolve issues with respect to orders for dental products. The dental relationship management system may further generate insights based on the tracked dental order information and provide an interface for the user to view the insights. The insights may be useful in gauging the performance of the user or the organization the user is affiliated with. However, there is a need to provide to the user additional content designed to help the user improve performance with respect to dental orders and the relationship between dental offices and dental labs.

According to various aspects of the subject disclosure, the dental relationship management system may also analyze dental orders associated with a user, identify areas for improvement, and provide customized content to the user based on the areas for improvement. The areas for improvement may be identified based on the dental order events and metrics that are stored and calculated by the dental relationship management system.

Figure 15:
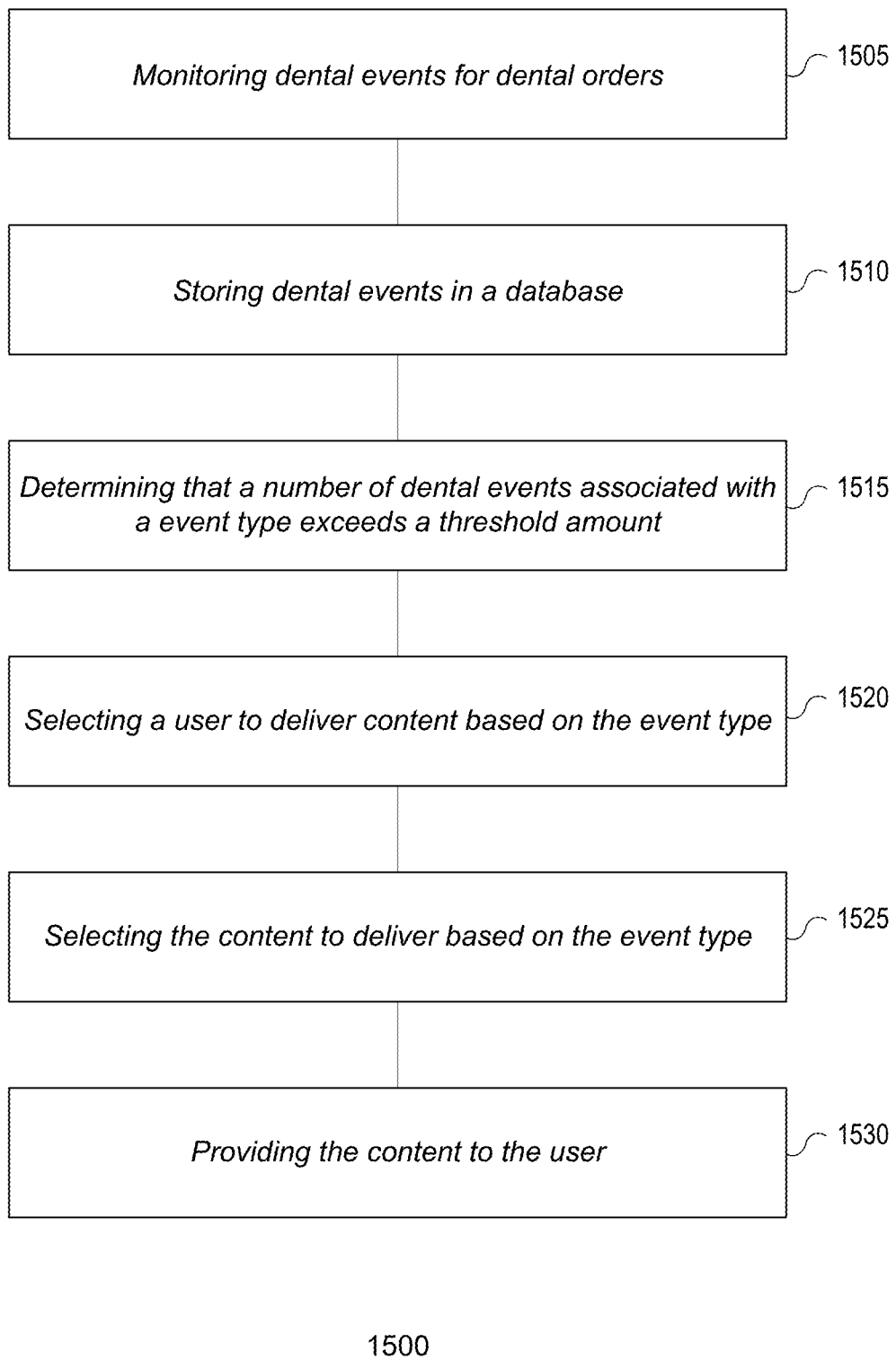
FIG. 15 is a block diagram illustrating an example process for providing content to a user, in accordance with various aspects of the subject technology.

FIG. 15 is a block diagram illustrating an example process 1500 for providing customized content to a user, in accordance with various aspects of the subject technology. For any process discussed herein, there can be additional, fewer, or alternative steps performed in similar order, alternative orders, or in parallel, within the scope of the various aspects unless otherwise stated. The process 1500 can be performed by a dental relationship management system (e.g., the dental relationship management system 200 of FIG. 2) or similar system.

At operation 1505, the dental relationship management system monitors dental events for dental orders on the platform. Each dental order is for a dental product (e.g., a dental product, dental device, implant, etc.) and submitted by a dental office to be fulfilled by a dental laboratory. The dental relationship management system may detect dental events that occur on the platform or are reported to the dental relationship management system by the dental office, the dental lab, or a third party (e.g., a delivery or communication service).

Each dental event may be associated with an event type and metadata. For example, the event types may include new order submissions, case alert events, rework events, fabrication events (e.g., starting fabrication, done with fabrication, etc.), and shipment and delivery events (e.g., waiting for pickup, in transit, delivered, received, etc.). The metadata may include dental event details that help the dental relationship management system track the dental events and provide insights to users. Metadata may include, for example, timestamp data, location data, patient data, information on one or more dental products for fabrication, instructions, or attachments that aid the dental lab in fulfilling the dental order.

Metadata may also be specified for particular event types. For example, rework events may be further associated with a subtype of rework event that represents one or more reasons that a rework event was invoked or requested by a dental office. Similarly, case alert events may also be associated with a subtype that represents one or more conditions that caused the case alert event.

At operation 1510, the detected or monitored dental events and the information associated with the dental events are stored in a data store (e.g., a database). The information may be collected and stored over a period of time and later analyzed to generate insights on past performance and other content. For example, at operation 1515, the dental relationship management system may determine that a number of dental events associated with a particular event type or subtype exceed a threshold. For example, the number of case alerts events or rework events may exceed a threshold number. According to some aspects, the dental relationship management system may determine that a number of dental events of a certain event type and subtype exceed a threshold. For example, the dental relationship management system may determine that case alerts of subtype "Fabrication Instruction Unclear," which signifies that the cause of the case alerts is that the fabrications instructions from the dental office were unclear, exceed a threshold number.

The threshold may be a static number set by an administrator or by a user in a user's preferences page. In other aspects, the may be dynamic or relative. For example, the threshold may be a percentage of dental orders received by the dental relationship management system during a time period. Alternatively or additionally, the threshold may be based on the relative number of one event type compared to one or more other event types. For example, there may be a threshold for order submissions that may be a percentage of the average number or volume of order submissions for the past x months. In another example, the threshold may be the maximum number of occurrences of other event types or event subtypes. According to some aspects, the dental relationship management system may determine that a particular event type and/or a particular subtype associated with an event type occurs the most (e.g., more than any other event type and/or other subtype).

Once an event type or event subtype is identified, at operation 1520, the dental relationship management system selects a user to whom to deliver content based on the identified event type or subtype. According to some aspects, each type or subtype may be mapped to a recipient party (e.g., the dental office or the dental lab). For example, case alerts of subtype "Fabrication Instruction Unclear" may be mapped to the dental office because the dental office may be in a better position to address those issues to eliminate case alerts of this subtype.

At operation 1525, the dental relationship management system selects the content to deliver to the selected recipient based on the identified event type or subtype. According to some aspects, each type or subtype may be mapped to a content to be delivered. For example, case alerts of subtype "Fabrication Instruction Unclear" may be mapped to content designed to reduce the number of case alerts of this subtype. The content may be, for example, educational links, videos, tutorials, descriptions of standards, or other content. If additional information about why the fabrication instructions were unclear were recorded by the dental relationship management system, those reasons may also be used to select content for the user.

After the content is selected, at operation 1530, the dental relationship management system provides the content to the selected user. The content may be delivered to the user via the platform (e.g., the platform illustrated in FIG. 5), via email, text, or by any other communications channel.

According to various aspects of the subject disclosure, the dental relationship management system may also provide customized content to the user based on one or more turnaround times. The turnaround times may include, for example, a dental order turnaround time 635 as illustrated in FIG. 6 and/or FIG. 13, a case alert turnaround time 630 as illustrated in FIG. 6 and/or FIG. 12, response times, or other turnaround times. For example, the dental relationship management system may determine that a mean or median turnaround time exceeds a threshold amount of time. In other variations, the dental relationship management system may identify turnaround time with the largest median or mean value. The dental relationship management system may select content based on the turnaround time and provide content to the user. The content may be, for example, an alert or notification of what the mean or median turnaround time is or that the turnaround time exceeds the threshold.

In some aspects, further analysis may be done to identify potential causes of a lengthy turnaround time. For example, the dental relationship management system may determine if there is a correlation between longer than average turnaround times and the occurrence of a case alert or case rework. If a correlation is found, the dental relationship management system may identify one or more subtypes of case alerts or case reworks that represent the reason that a case alert or case rework occurred. For example, the most common case alert subtype may be identified and content may be selected based on the subtype. For example, the content may include content designed to reduce the number of case alerts of this subtype and, as a result, also reduce the average turnaround time. The content may be, for example, educational links, videos, tutorials, descriptions of standards, or other content.

According to various aspects of the subject disclosure, the dental relationship management system may also provide customized content to the user based on one or more scores. The scores may include, for example, a relationship score between the user and an entity that the user interacts with, an entity score associated with the user, a relationship score for the user and an entity that the user interacts with, or a combination of scores. The dental relationship management system may compare a score with a threshold score (e.g., whether the score exceeds or is below the threshold score), select content based on the comparison, and provide content to the user.

The content may be an alert or notification of the score, a notification that the score exceeds or is below the threshold score, and/or recommendations or suggested actions. The dental relationship management system may determine causes of the various scores and identify possible actions to be taken to increase a score. For example, if a score is a result of case reworks or case alerts, the dental relationship management system may identify one or more common subtypes of case alerts or case reworks and content designed to reduce the number of case alerts or case reworks may be provided to the user. If a cause of a score is a poor relationship with a particular dental office or a particular dental lab, the dental relationship management system may identify the relationship, identify one or more potential causes of the poor relationship, and provide recommendations or suggestions to improve the relationship with that entity.

In some aspects, the dental relationship management system may recommend or suggest a replacement entity. For example, the user may be provided with a suggestion that subsequent work with one entity (e.g., a dental lab that a dental office user works with) is sent to another entity (e.g., a different dental lab).

The relationship score and the entity scores may be generated in various ways. A relationship score may be configured to represent the strength of a relationship between two entities working together. The relationship score between the two entities may be calculated based on the information collected by the platform provided by the dental relationship management system. For example, a relationship score between a dental office and a dental lab may be calculated based on a number of case alerts for orders between the dental office and the dental lab, a number of case reworks for orders between the dental office and the dental lab, and/or an average turnaround time for dental orders, reworks, or case alerts associated with the dental office and the dental lab.

According to various aspects of the subject technology, the dental relationship management system may further provide an interface that enables a user to provide a rating of dental orders, dental labs, dental offices, or other personnel or entities associated dental products. The interface may also allow users to provide comments regarding their experience with a dental order or an entity that the user works with.

These ratings and comments may also be used to generate relationship scores and/or select content to provide the user. For example, ratings for dental orders between a dental office and a dental lab and/or ratings from users in the dental office about the dental lab may be used to calculate a relationship score between a dental office and a dental lab. The comments may be analyzed to identify potential causes of the ratings. For example, the comments may undergo natural language processing or keyword processing to identify one or more areas for improvement and content directed to these one or more areas of improvement may be selected and provided to the user.

In contrast to a relationship score configured to represent the strength of a relationship between two entities working together, an entity score may be configured to represent a more general view of the performance of an entity. The entity score for an entity (e.g., a dental office or a dental lab) may be calculated based on the relationship scores associated with the entity. The entity score may also be calculated based on other information about the entity collected by the platform provided by the dental relationship management system. The relationship between entity scores and relationship scores are described in further detail with respect to FIG. 16.

Figure 16:
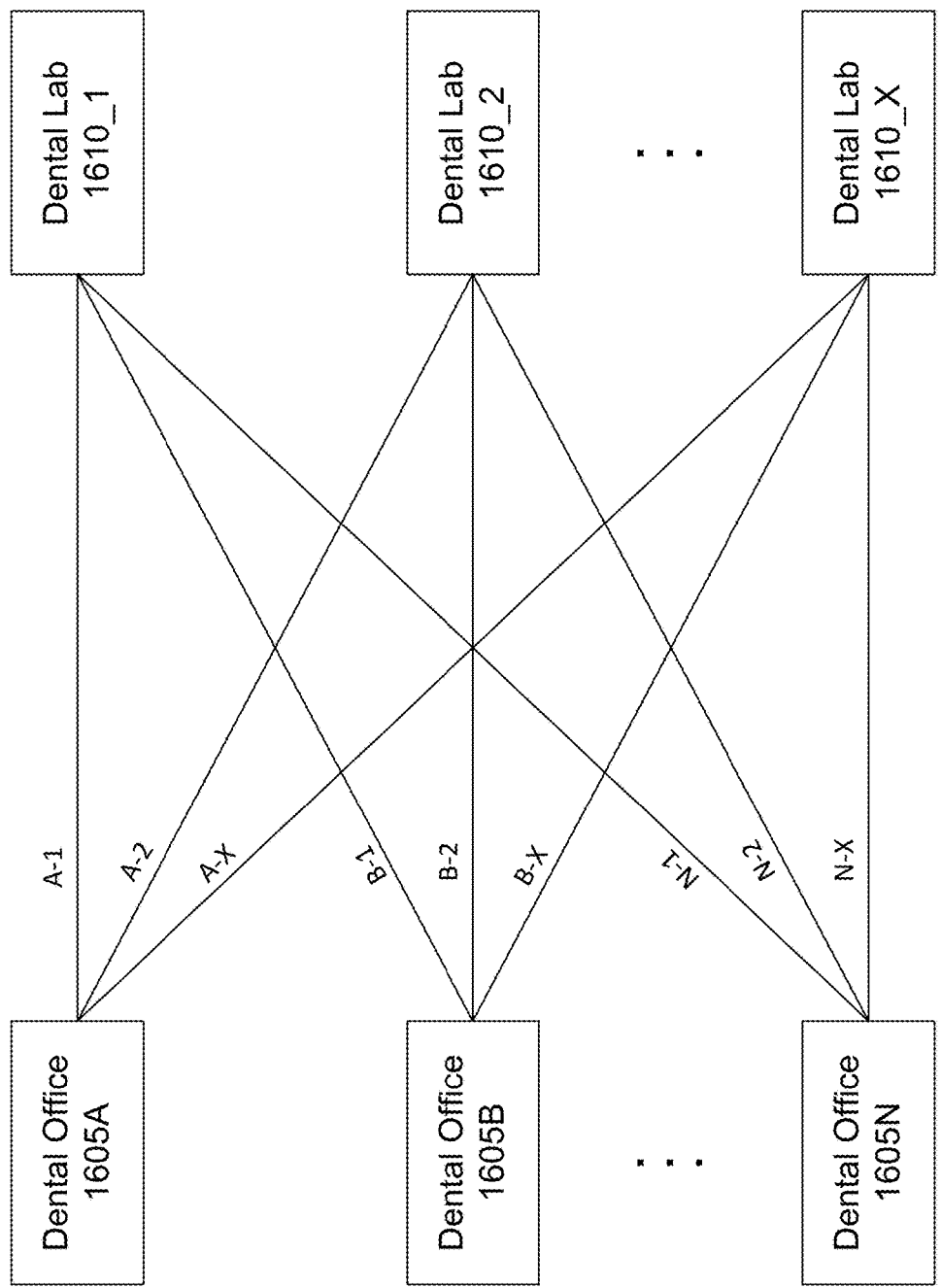
FIG. 16 is a conceptual block diagrams illustrating an example dental ecosystem, in accordance with various aspects of the subject technology.

FIG. 16 is a conceptual block diagrams illustrating an example dental ecosystem 1600, in accordance with various aspects of the subject technology. The dental ecosystem 1600 includes n dental offices 1605A-1605N and x dental labs 1610_1-1610_X. The lines between the dental offices and the dental labs represent relationship scores between the two entities that each line connects. For example, line A-1 represents the relationship score between dental office 1605A and dental lab 1610_1, line A-2 represents the relationship score between dental office 1605A and dental lab 1610_2, and line A-X represents the relationship score between dental office 1605A and dental lab 1610_X. Although each dental office in dental ecosystem 1600 is shown in FIG. 16 having a relationship score with each dental lab, in some scenarios, some dental offices and dental labs in the dental ecosystem may not have relationships.

As described above, each relationship score may be calculated based on the information collected by the dental relationship management system. For example, the relationship score between dental office 1605A and dental lab 1610_1 represented by line A-1 may be calculated based on dental orders, case alerts, case reworks, and/or turnaround times associated with dental orders between dental office 1605A and dental lab 1610_1. The relationship score may also be based on ratings or comments associated with dental orders between dental office 1605A and dental lab 1610_1, ratings or comments from personnel associated with dental office 1605A about dental lab 1610_1, and/or ratings or comments from personnel associated with dental lab 1610_1 about dental office 1605A. The other relationship scores represented in dental ecosystem 1600 may be similarly calculated.

Entity scores for an entity may be generated based on the relationship scores of that entity in the dental ecosystem. For example, the entity score for dental office 1605A may be calculated based on the relationship scores represented by lines A-1, A-2, and A-X. The entity score for dental lab 1610_1 may be calculated based on relationship scores represented by lines A-1, B-1, and N-1. According to some aspects, the entity score may be an average of relationship scores associated with the entity. According to other aspects, the entity score may be based on additional metrics and data. For example, the entity score for an entity may also be calculated based on data regarding dental orders, case alerts, case reworks, turnaround times, ratings, or comments about the entity or dental orders associated with the entity.

According to various aspects of the disclosed subject matter, the dental relationship management system may also provide content to users of the platform based on the various relationship scores and entity scores.

Figure 17:
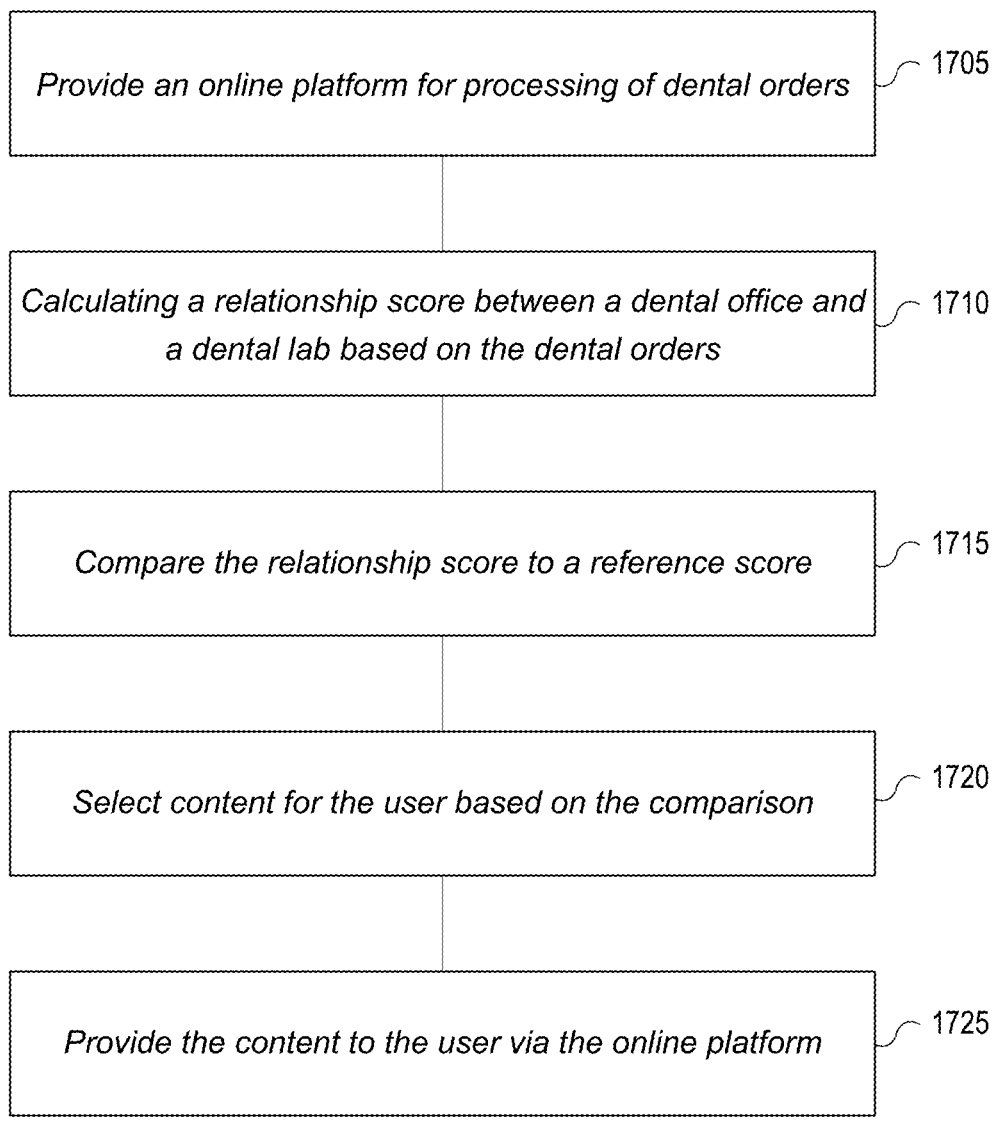
FIG. 17 is a block diagram illustrating an example process for providing content to a user of an online platform provided by the relationship management system, in accordance with various aspects of the subject technology.

FIG. 17 is a block diagram illustrating an example process 1700 for providing content to a user of an online platform provided by the dental relationship management system, in accordance with various aspects of the subject technology. It should be understood that, for any process discussed herein, there can be additional, fewer, or alternative steps performed in similar or alternative orders, or in parallel, within the scope of the various aspects unless otherwise stated. The process 1500 can be performed by a dental relationship management system (e.g., the dental relationship management system 200 of FIG. 2) or similar system.

At operation 1705, the dental relationship management system provides an online platform configured to facilitate the processing of dental orders between one or more dental offices and one or more dental labs. At operation 1710, the dental relationship management system calculates one or more relationship scores between one or more of the dental offices and one or more of the dental laboratories. Each dental relationship score is associated with two dental entities, typically a dental office and a dental lab.

The dental relationship score is calculated based on the dental orders on the online platform that are between that dental office and that dental lab and other related information. For example, the relationship score may be based on a number of dental orders between the two entities, a number of case alerts for those dental orders, a number of case reworks for those orders, and/or an average turnaround time for the dental orders, reworks, or case alerts. The relationship score may also be based on one or more ratings or comments from the dental office about the dental orders of the dental lab or one or more ratings or comments from the dental lab about the dental orders of the dental office.

At operation 1715, the dental relationship management system may compare a relationship score between a dental office and a dental lab to a reference score. The reference score may be a threshold score or a target score. The threshold score may be a score that the relationship score should not fall below or exceed. Based on the comparison of the relationship score with a threshold score, a user may be provided with content that includes an alert notification informing the user that the relationship score is nearing the threshold or has crossed the threshold. The content may also include tips, recommendations, or suggestions that can be taken to improve the relationship score. These this content may be generated based on analysis of the dental orders (e.g., the number of case alerts or case reworks, average turnaround times, most common causes of case alerts or case reworks, etc.).

The target score may be a score that the entities may strive to achieve. Based on the comparison of the relationship score with a target score, a user may be provided with content that includes an alert notification that the relationship score is near or has reached the target score. The content may further include addition content configured to further improve the relationship score or provide a reward.

According to some aspects, the reference score may also be based on other relationship scores between the dental office and one or more other dental labs, the dental lab and one or more other dental offices, or other dental entities. For example, the reference score may be based on an average, high, or low relationship score for the dental office, the dental lab, or across the dental ecosystem. Based on the comparison of the relationship score with the reference score, the user may be provided with a report on how the relationship between the dental office and the dental lab is compared with other relationship scores for the dental office, other relationship scores for the dental lab, or other relationship scores in the dental ecosystem.

At operation 1720, the dental relationship management system may select content for a user based on the comparing of the relationship score to the reference score and, at operation 1725, provide the content to the user via the online platform. The user may be, for example, personnel associated with a dental office, a dental lab, a dental service organization (DSO), or other entity in the dental ecosystem.

According to some aspects of the subject technology, the dental relationship management system may also select content or additional content based on entity scores. For example, the dental relationship management system may calculate an entity score for the dental office based on relationship scores associated with the dental office. Additionally or alternatively, the dental relationship management system may calculate an entity score for the dental lab based on relationship scores associated with the dental lab. The entity scores may also be calculated based on ratings or comments associated with the dental office or the dental lab or any other dental order information managed by the dental relationship management system.

Based on the one or more entity scores that are calculated, the user may be provided with content including, for example, the entity score of the dental office, the entity score of the dental lab, average entity scores for dental offices and/or dental labs, and content configured to improve an entity score. These this content may be generated based on analysis of the dental orders for the entity (e.g., the number of case alerts or case reworks, average turnaround times, most common causes of case alerts or case reworks, etc.).

Various aspects of the subject disclosure are described herein with respect to a dental office for the sake of clarity, however, application of these aspects to dental practices, dentists, dental office staff or related personnel, orthodontists, DSOs, FQHCs, dental labs, or other oral health professionals and organizations are also within the scope of the various aspects. Furthermore, aspects of the subject technology may extend to other entities such as dental device manufacturers or vendors. For example, some aspects described herein relate to relationship and entity scores for dental offices (or DSOs and FQHCs) and dental labs and providing content to dental offices and dental labs. Other aspects relate to relationship and entity scores dental labs and dental product vendors or manufacturers and/or dental offices and dental product vendors or manufacturers. Furthermore, content may be provide to dental labs, dental offices, or dental product vendors and manufacturers.

Figure 18:
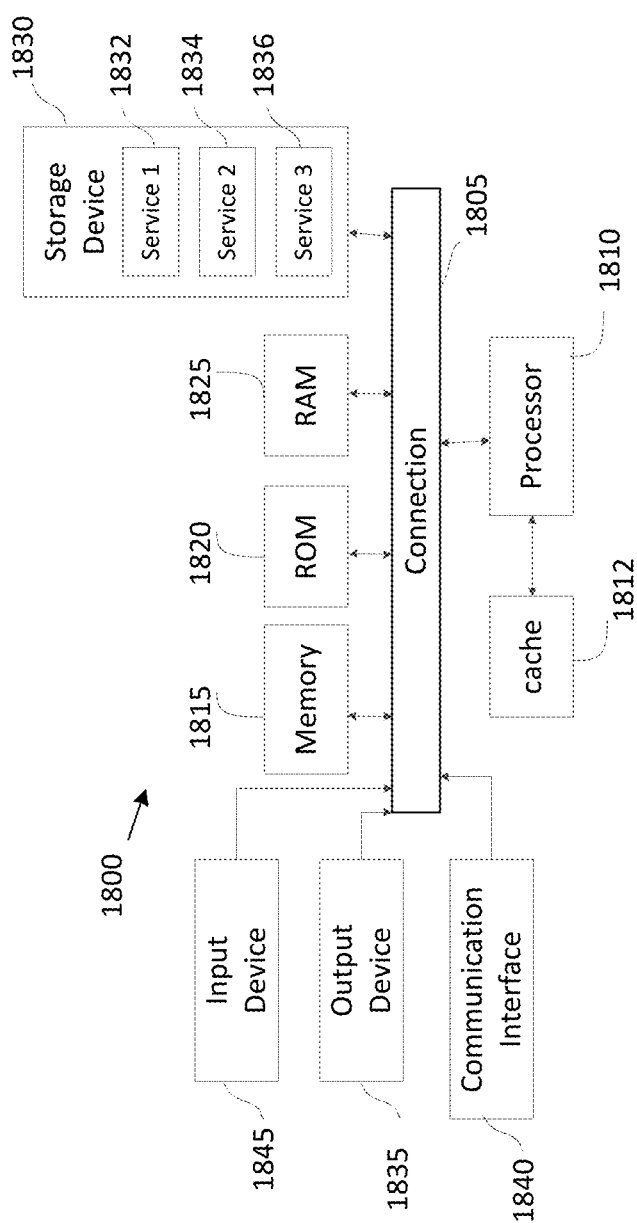
FIG. 18 shows an example of a system for implementing certain aspects of the present technology.

FIG. 18 illustrates an example computing system architecture 1800 wherein the components of the system are in communication with each other using a connection 1805. Connection 1805 can be a physical connection via a bus, or direct connection into processor 1810 such as in a chipset architecture. Connection 1805 can also be a virtual connection, networked connection, or logical connection.

In some aspects, 1800 is a distributed system, wherein the functions described with respect to the components herein can be distributed within a datacenter, multiple datacenters, geographically, etc. In some aspects, one or more of the described system components represents many such components each performing some or all of the function for which the component is described. In some aspects, the components described herein can be physical or virtual devices.

Example system 1800 includes at least one processing unit (CPU or processor) 1810 and a connection 1805 that couples various system components including the system memory 1815, such as read only memory (ROM) and random access memory (RAM) to the processor 1810. The system 1800 can include a cache 1812 of high-speed memory connected directly with, in close proximity to, or integrated as part of the processor 1810.

The processor 1810 can include any general purpose processor and a hardware service or software service, such as service 1 1832, service 2 1834, and service 3 1836 stored in storage device 1830, configured to control the processor 1810 as well as a special-purpose processor where software instructions are incorporated into the actual processor design. The processor 1810 may essentially be a completely self-contained computing system, containing multiple cores or processors, a bus, memory controller, cache, etc. A multi-core processor may be symmetric or asymmetric.

To enable user interaction with the computing device 1800, an input device 1845 can represent any number of input mechanisms, such as a microphone for speech, a touch-sensitive screen for gesture or graphical input, keyboard, mouse, motion input, speech and so forth. An output device 1835 can also be one or more of a number of output mechanisms known to those of skill in the art. In some instances, multimodal systems can enable a user to provide multiple types of input to communicate with the computing device 1800. The communications interface 1840 can generally govern and manage the user input and system output. There is no restriction on operating on any particular hardware arrangement and therefore the basic features here may easily be substituted for improved hardware or firmware arrangements as they are developed.

Storage device 1830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1825, read only memory (ROM) 1820, and hybrids thereof.

The storage device 1830 can include software services, servers, services, etc., that when the code that defines such software is executed by the processor 1810, it causes the system to perform a function. In some aspects, a hardware service that performs a particular function can include the software component stored in a computer-readable medium in connection with the necessary hardware components, such as the processor 1810, bus 1805, display 1835, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program, or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
monitoring, by one or more processing units of a server associated with a dental relationship management system, a network environment including one or more dental offices and one or more dental laboratories for online dental events that are determined by the dental relationship management system to have caused online dental orders processed through an online platform for the dental relationship management system to be delayed longer than a determined average processing time, wherein each online dental event is associated with an event type and event metadata with respect to a respective dental order that is tracked throughout processing of the respective dental order until the processing is completed;
storing data, including the online dental events, associated event types, and the event metadata, in a centralized database, having one or more relational databases, wherein the data stored are organized with relational data used to score metrics of the data;
determining, by the one or more processing units of the server processing through the event metadata in the centralized database, that a number of online dental events in the centralized database associated with a particular event type exceeds a dynamic event threshold with respect to a particular dental office or a particular dental laboratory based on the scoring of the metrics based on the relational data;
providing a dashboard displaying customized metrics for each of the one or more dental offices and the one or more dental laboratories based on the scoring of the metrics based on the relational data to display through a display interface device of each of the one or more dental offices and the one or more dental laboratories; and
delivering a customized content alert to display through the dashboard associated with exceeding the dynamic event threshold, wherein the customized content alert is associated with assisting avoidance of further instances of exceeding the dynamic event threshold with respect to the particular event type and based on areas of improvement identified based on the scoring of the metrics based on the relational data.

2. The computer-implemented method of claim 1, further comprising:
identifying a most common subtype of the particular event type based on the number of online dental events in the centralized database, wherein the customized content alert delivered to the particular dental office or the particular dental laboratory is further based on the most common subtype of the event type.

3. The computer-implemented method of claim 1, further comprising:
calculating an average turnaround time for a plurality of dental orders from one dental office to one dental laboratory;
determining that the average turnaround time exceeds a turnaround threshold; and
decreasing a relationship score between the one dental office and the one dental laboratory.

4. The computer-implemented method of claim 1, further comprising:
determining an entity score of the particular dental office or the particular dental laboratory, wherein the entity score is calculated based on relationship scores associated with the particular dental office or the particular dental laboratory.

5. The computer-implemented method of claim 1, further comprising:
decreasing a relationship score between the particular dental office or the particular dental laboratory and one or more other entities associated with the exceeding of the dynamic event threshold, the relationship score indicating strength of a relationship between the entities, wherein the relationship score is calculated based on a number of customized content alerts delivered associated with exceeding associated event thresholds, case reworks, and average turnaround time for dental orders; and
comparing the relationship score to a reference score, wherein the customized content alert delivered is further based on the comparing.

6. The computer-implemented method of claim 5, further comprising:
receiving one or more ratings associated with a plurality of dental orders, wherein the relationship score is further calculated based on the one or more ratings.

7. The computer-implemented method of claim 1, further comprising:
receiving one or more ratings associated with a plurality of dental orders, wherein a relationship score is further calculated based on the one or more ratings.

8. The computer-implemented method of claim 1, wherein the delivering of the customized content alert to the particular dental office or the particular dental laboratory comprises providing a network accessible interface comprising the customized content alert.

9. The computer-implemented method of claim 1, further including:
calculating an entity score for each dental office or dental laboratory, wherein the entity score is based on relationship scores between each dental office or the dental laboratory and other entities.

10. The computer-implemented method of claim 1, wherein the event type is one of a dental order submission, a dental order rework, a dental order case alert, or a dental order delivery.

11. A dental relationship management system comprising:
one or more processors; and
a non-transitory computer-readable medium storing instructions that, when executed by the one or more processors, cause the dental relationship management system to perform operations including:
monitoring a network environment including one or more dental offices and one or more dental laboratories for online dental events that are determined by the dental relationship management system to have caused online dental orders processed through an online platform for the dental relationship management system to be delayed longer than a determined average processing time, wherein each online dental event is associated with an event type and event metadata with respect to a respective dental order that is tracked throughout processing of the respective dental order until the processing is completed an associated dental product is received;
storing data, including the online dental events, associated event types, and the event metadata, in a centralized database, having one or more relational databases, wherein the data stored are organized with relational data, relating the data, and used to score metrics of the data;
determining that a number of online dental events in the centralized database associated with a particular event type exceeds a dynamic event threshold with respect to a particular dental office or a particular dental laboratory based on the scoring of the metrics based on the relational data and the relating of the data;
providing a dashboard displaying customized metrics for each of the one or more dental offices and the one or more dental laboratories based on the scoring of the metrics based on the relational data and the relating of the data to display through a display interface device of each of the one or more dental offices and the one or more dental laboratories; and
delivering a customized content alert to display through the dashboard associated with exceeding the dynamic event threshold, wherein the customized content alert is associated with assisting avoidance of further instances of exceeding the dynamic event threshold with respect to the particular event type and based on areas of improvement identified based on the scoring of the metrics based on the relational data of the data and the relating of the data.

12. The dental relationship management system of claim 11, wherein the delivering of the customized content alert comprises providing a network accessible interface comprising the customized content alert.

13. The dental relationship management system of claim 11, wherein facilitates processing of dental orders from one dental office to one dental laboratory, wherein dental order information is based on the dental orders.

14. The dental relationship management system of claim 13, wherein the operations further include:
calculating an entity score for each dental office or dental laboratory, wherein the entity score is based on relationship scores between the dental office or the dental laboratory and other entities.

15. The dental relationship management system of claim 11, wherein the operations further include:
identifying a most common subtype of the particular event type based on dental order information, wherein the customized content alert delivered to a particular dental office or a particular dental laboratory is further based on the most common subtype of the event type.

16. The dental relationship management system of claim 11, wherein the number of online dental events are associated with dental orders from a dental office to a dental laboratory, the operations further include:
comparing a relationship score to a reference score, wherein the customized content alert delivered is further based on the comparing.

* * * * *